US011533099B2

(12) United States Patent
Kakishima et al.

(10) Patent No.: US 11,533,099 B2
(45) Date of Patent: Dec. 20, 2022

(54) METHOD OF SELECTING RECEPTION RESOURCE AND METHOD OF CSI-RS TRANSMISSION

(71) Applicants: DONOMO INNOVATIONS, INC., Palo Alto, CA (US); NTT DOCOMO, INC., Tokyo (JP)

(72) Inventors: Yuichi Kakishima, Tokyo (JP); Chongning Na, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/324,874

(22) PCT Filed: Aug. 11, 2017

(86) PCT No.: PCT/US2017/046471
§ 371 (c)(1),
(2) Date: Feb. 11, 2019

(87) PCT Pub. No.: WO2018/031870
PCT Pub. Date: Feb. 15, 2018

(65) Prior Publication Data
US 2019/0173563 A1    Jun. 6, 2019

Related U.S. Application Data

(60) Provisional application No. 62/373,758, filed on Aug. 11, 2016.

(51) Int. Cl.
*H04B 7/08*  (2006.01)
*H04B 7/06*  (2006.01)
(Continued)

(52) U.S. Cl.
CPC ........... *H04B 7/088* (2013.01); *H04B 7/0408* (2013.01); *H04B 7/0626* (2013.01); *H04B 7/0874* (2013.01); *H04B 17/309* (2015.01)

(58) Field of Classification Search
CPC ....................................................... H04B 7/088
(Continued)

(56) References Cited

U.S. PATENT DOCUMENTS 8,416,748 B2 *  4/2013  Kishigami ............ H04W 16/28
                                                    370/334
9,219,531 B2    12/2015  Sofer et al.
(Continued)

FOREIGN PATENT DOCUMENTS

EP         2320576 A2      5/2011
JP      2010-206421 A      9/2010
(Continued)

OTHER PUBLICATIONS

International Search Report issued in PCT/US2017/046471, dated Jan. 18, 2018 (6 pages).
(Continued)

*Primary Examiner* — Lihong Yu
(74) *Attorney, Agent, or Firm* — Osha Bergman Watanabe & Burton LLP

(57) ABSTRACT

A method of selecting a reception resource of a user equipment (UE) includes receiving, with the UE, multiple predetermined signals from a base station (BS) using multiple reception resources, measuring, with the UE, reception quality of the predetermined signals, and selecting, with the UE, at reception resource used for reception of a downlink signal from the multiple reception resources based on the measured reception quality. The method further includes receiving, with the UE, the downlink signal using the selected reception resource. The selecting selects the reception resource used for reception of the predetermined signal of which reception quality is higher than reception quality of the other predetermined signals.

6 Claims, 21 Drawing Sheets

(51) Int. Cl.
*H04B 7/0408* (2017.01)
*H04B 17/309* (2015.01)

(58) Field of Classification Search
USPC .......................................................... 375/262
See application file for complete search history.

(56) References Cited

U.S. PATENT DOCUMENTS

| | | | | |
|---|---|---|---|---|
| 10,868,596 | B2* | 12/2020 | Hwang | H04B 7/0413 |
| 2008/0069033 | A1* | 3/2008 | Li | H04W 48/16 |
| | | | | 370/328 |
| 2011/0019637 | A1* | 1/2011 | Ojala | H04L 1/0026 |
| | | | | 370/329 |
| 2011/0026418 | A1* | 2/2011 | Bollea | H01Q 1/2258 |
| | | | | 370/252 |
| 2011/0150049 | A1* | 6/2011 | Dent | H04L 5/0048 |
| | | | | 375/219 |
| 2011/0199986 | A1* | 8/2011 | Fong | H04L 5/0073 |
| | | | | 370/329 |
| 2012/0120842 | A1* | 5/2012 | Kim | H04B 7/024 |
| | | | | 370/252 |
| 2013/0034040 | A1* | 2/2013 | Priotti | H04B 7/0417 |
| | | | | 370/312 |
| 2013/0044713 | A1* | 2/2013 | Suh | H04L 5/0048 |
| | | | | 370/329 |
| 2013/0286960 | A1 | 10/2013 | Li et al. | |
| 2014/0016497 | A1* | 1/2014 | Seo | H04B 17/318 |
| | | | | 370/252 |
| 2014/0206304 | A1 | 7/2014 | Zhang et al. | |
| 2015/0244432 | A1 | 8/2015 | Wang | |
| 2015/0341942 | A1* | 11/2015 | Lee | H04W 72/082 |
| | | | | 370/252 |
| 2015/0373674 | A1* | 12/2015 | Han | H04W 16/14 |
| | | | | 370/329 |
| 2016/0065290 | A1* | 3/2016 | Zhu | H04W 4/70 |
| | | | | 370/329 |
| 2016/0134352 | A1 | 5/2016 | Stirling-Gallacher | |
| 2016/0142189 | A1* | 5/2016 | Shin | H04L 5/0048 |
| | | | | 370/329 |
| 2016/0226709 | A1* | 8/2016 | Chen | H04L 1/0007 |
| 2016/0277090 | A1* | 9/2016 | Kim | H04B 7/0478 |
| 2016/0277165 | A1* | 9/2016 | Wei | H04L 27/0006 |
| 2017/0141894 | A1* | 5/2017 | Wei | H04L 5/0048 |
| 2017/0163320 | A1 | 6/2017 | Nagata et al. | |
| 2017/0215096 | A1* | 7/2017 | Moon | H04W 16/14 |
| 2017/0317731 | A1* | 11/2017 | Chen | H04B 7/04 |
| 2019/0173563 | A1 | 6/2019 | Kakishima et al. | |
| 2020/0163115 | A1 | 5/2020 | Wang et al. | |

FOREIGN PATENT DOCUMENTS

| | | |
|---|---|---|
| JP | 2011-234299 A | 11/2011 |
| JP | 201430135 A | 2/2014 |
| JP | 2014039312 A | 2/2014 |
| JP | 2014505401 A | 2/2014 |
| JP | 2015-521815 A | 7/2015 |
| JP | 2019528022 A | 10/2019 |
| WO | 2015/005641 A1 | 1/2015 |
| WO | 2015/191200 A1 | 12/2015 |

OTHER PUBLICATIONS

Written Opinion issued in PCT/US2017/046471, dated Jan. 18, 2018 (16 pages).
3GPP TS 36.211 V2.0.0; "3rd Generation Partnership Project; Technical Specification Group Radio Access Network; Evolved Universal Terrestrial Radio Access (E-UTRA); Physical Channels and Modulation; Release 8;" Sep. 2007; Valbonne, France (49 pages).
3GPP TS 36.213 V2.0.0; "3rd Generation Partnership Project; Technical Specification Group Radio Access Network; Evolved Universal Terrestrial Radio Access (E-UTRA); Physical Layer Procedures; Release 8;" Sep. 2007; Valbonne, France (13 pages).
Notice of Reason for Rejection in counterpart Japanese Application No. 2019-507806 dated Feb. 4, 2020 (12 pages).
Office Action issued in the counterpart European Patent Application No. 17754997.9, dated Dec. 1, 2020 (13 pages).
Samsung; "On aperiodic CSI-RS design"; 3GPP TSG RAN WG1 #85, R1-164773; Nanjing, China, May 23-27, 2016 (4 pages).
Office Action issued in Japanese Application No. 2020-085925; dated Jun. 29, 2021 (10 pages).
Office Action issued in Chinese Application No. 201780061226.4; dated Nov. 24, 2021 (12 pages).
Office Action issued in the counterpart European Patent Application No. 17754997.9, dated Apr. 8, 2022 (6 pages).

\* cited by examiner

FIG. 7

| Two bits | RS configuration number (Example of number of RS transmission) |
|---|---|
| 00 | RS configuration #1 (Number of RS transmission "0") |
| 01 | RS configuration #2 (Number of RS transmission "1") |
| 10 | RS configuration #3 (Number of RS transmission "2") |
| 11 | RS configuration #4 (Number of RS transmission "4") |

METHOD OF SELECTING RECEPTION RESOURCE AND METHOD OF CSI-RS TRANSMISSION

TECHNICAL FIELD

The present invention generally relates to a method of wireless communications and, more particularly, to a method of resource selection for downlink reception in a wireless communication system.

BACKGROUND ART

A New Radio (NR; fifth generation (5G) radio access technology) system operating in higher frequency bands (e.g., Millimeter Wave (mmWave)) are being studied in the Third Generation Partnership Project (3GPP). A user equipment (UE) operated in the higher frequency bands such as mmWave may equip two or more antenna panels, each of which might have different directivity from each other. For example, the two or more antenna panels may be disposed on two planes such as a front plane and a back plane of the UE. Each plane of the UE may include at least an antenna panel. Alternatively, multiple antenna panels may be disposed on 4, 6, or more planes of the UE.

Furthermore, mmWave channel characteristics differ greatly from channel characteristics of conventional frequency bands. As a result, for example, only a part of the multiple antenna panels of the UE may effectively operate compared to other multiple antenna panels, due to large path loss and blockage for higher frequency bands.

Therefore, an effective antenna panel switching (selection) technology may be required in a wireless communication system operating in higher frequency bands such as mmWave bands. However, current Long Term Evolution (LTE) standards do not support an antenna panel switching scheme, which is required for NR system.

CITATION LIST

Non-Patent Reference

[Non-Patent Reference 1] 3GPP, TS 36.211 V 13.2.0
[Non-Patent Reference 2] 3GPP, TS 36.213 V 13.2.0

SUMMARY OF THE INVENTION

According to one or more embodiments of the present invention, a method of selecting a reception resource of a user equipment (UE) includes receiving, with the UE, multiple predetermined signals from a base station (BS) using multiple reception resources, measuring, with the UE, reception quality of the predetermined signals, and selecting, with the UE, at reception resource used for reception of a downlink signal from the multiple reception resources based on the measured reception quality.

According to one or more embodiments of the present invention, a method of Channel State Information-Reference Signal (CSI-RS) transmission includes transmitting, from a base station (BS) to a user equipment (UE), multi-shot CSI-RSs.

According to one or more embodiments of the present invention, a method of Channel State Information-Reference Signal (CSI-RS) transmission transmitting, from a base station (BS) to a user equipment (UE), information that instructs to disable CSI feedback from the UE.

According to one or more embodiments of the present invention, when the UE comprises multiple reception resources used for reception of a downlink signal or a downlink channel, the reception resources can be properly selected from the multiple reception resources.

BRIEF DESCRIPTION OF THE DRAWINGS

FIG. 7 is a diagram showing an example of a table indicating the number of RS transmission according to one or more embodiments of the modified second example of the present invention.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
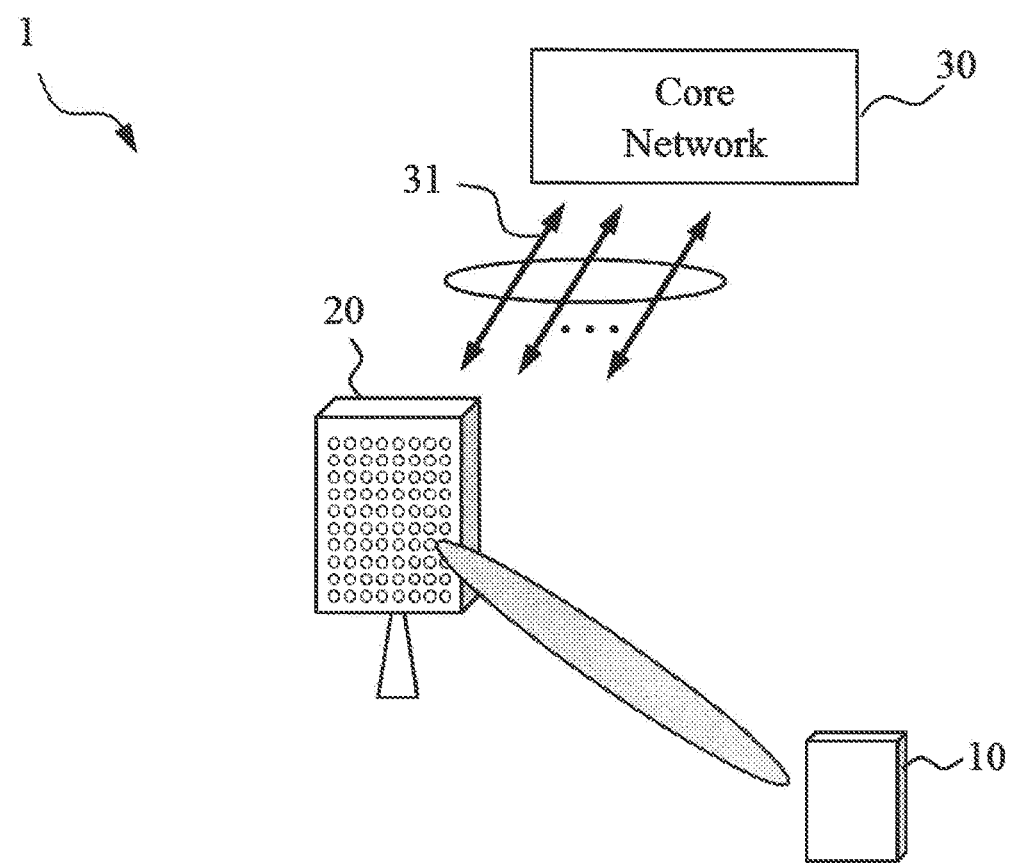
FIG. 1 is a diagram showing a configuration of a wireless communication system according to one or more embodiments of the present invention.

FIG. 1 illustrates a wireless communications system 1 according to one or more embodiments of the present invention. The wireless communication system 1 includes a user equipment (UE) 10, a base stations (BS) 20, and a core network 30. The wireless communication system 1 may be an LTE/LTE-Advanced (LTE-A) system, New Radio (NR), or other systems. The wireless communication system 1 is not limited to the specific configurations described herein and may be any type of wireless communication system.

The BS 20 may communicate uplink (UL) and downlink (DL) signals with the UE 10 in a cell 21. The DL and UL signals may include control information and user data. The BS 20 may communicate DL and UL signals with the core network 30 through backhaul links 31. The BS 20 may be Evolved NodeB (eNB).

The BS 20 includes one or more antennas, a communication interface to communicate with an adjacent BS 20 (for example, X2 interface), a communication interface to communicate with the core network 30 (for example, S1 interface), and a CPU (Central Processing Unit) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system 1.

The UE 10 may communicate DL and UL signals that include control information and user data with the BS 20. The UE 10 may be a mobile station, a smartphone, a cellular phone, a tablet, a mobile router, or information processing apparatus having a radio communication function such as a wearable device. The wireless communication system 1 may include one or more UEs 10.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

Figure 2A:
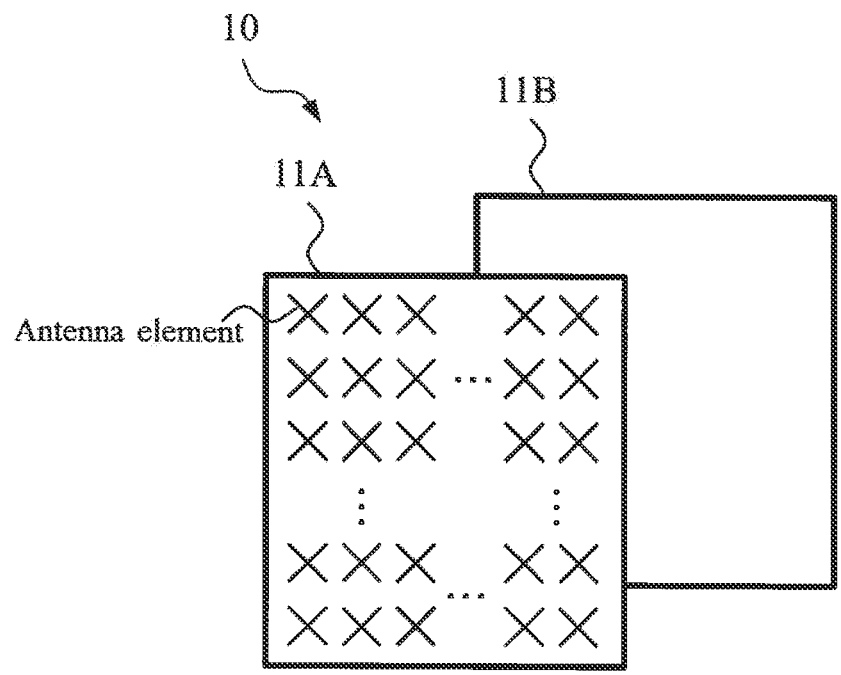
FIGS. 2A, 2B, 2C, 2D, and 2E are diagrams showing example deployment configurations of multiple reception resources of a UE according to one or more embodiments of the present invention.
Figure 2B:
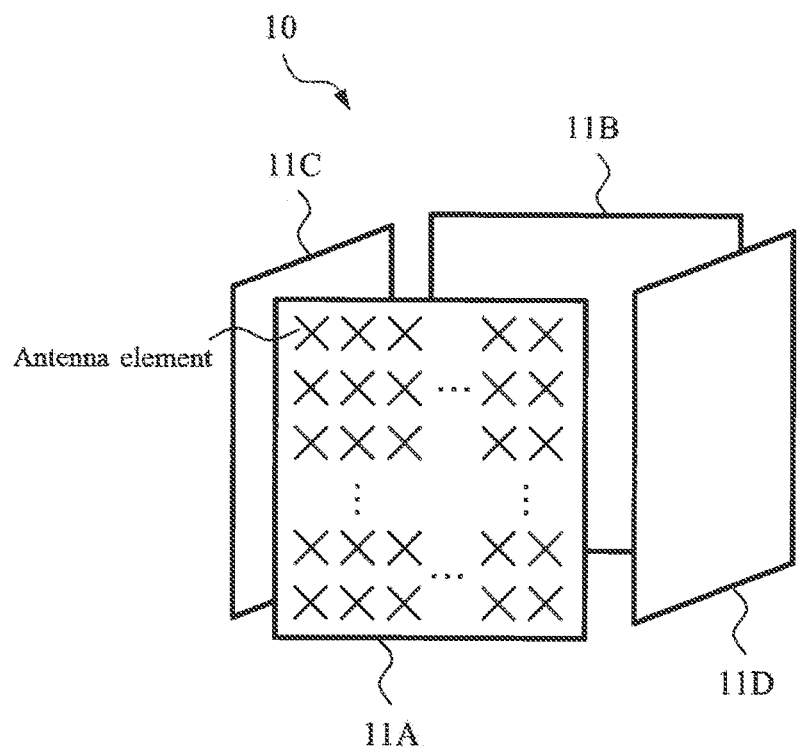
Figure 2C:
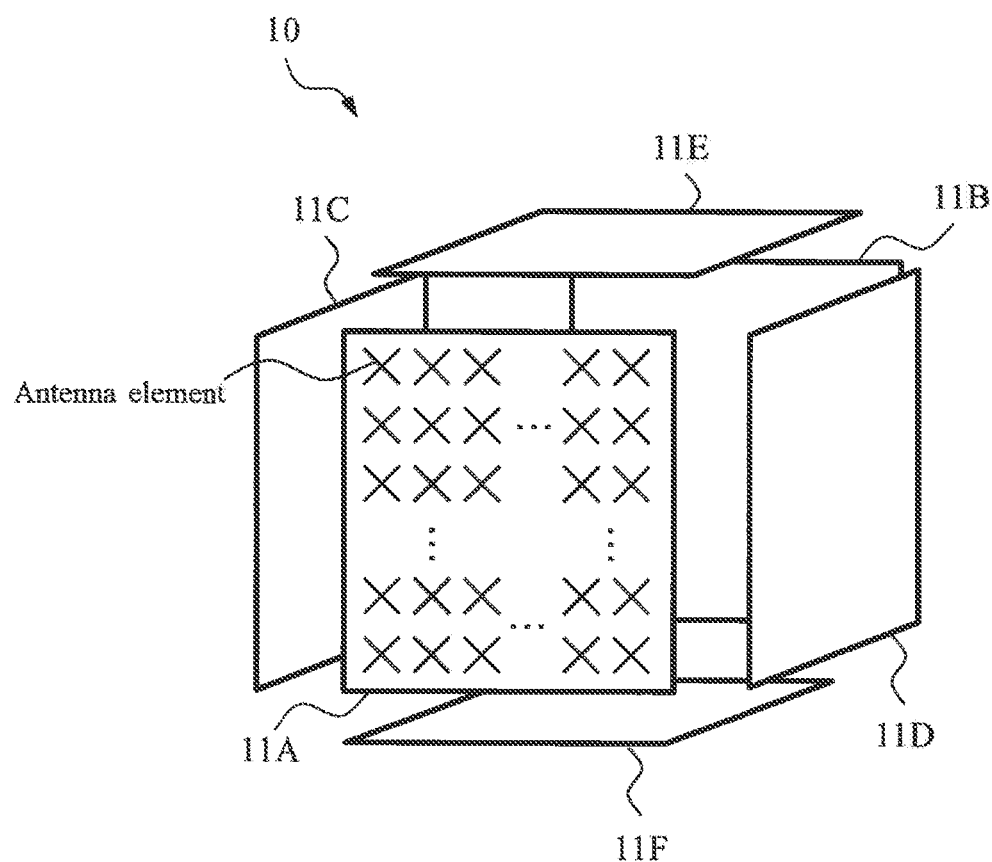
Figure 2D:
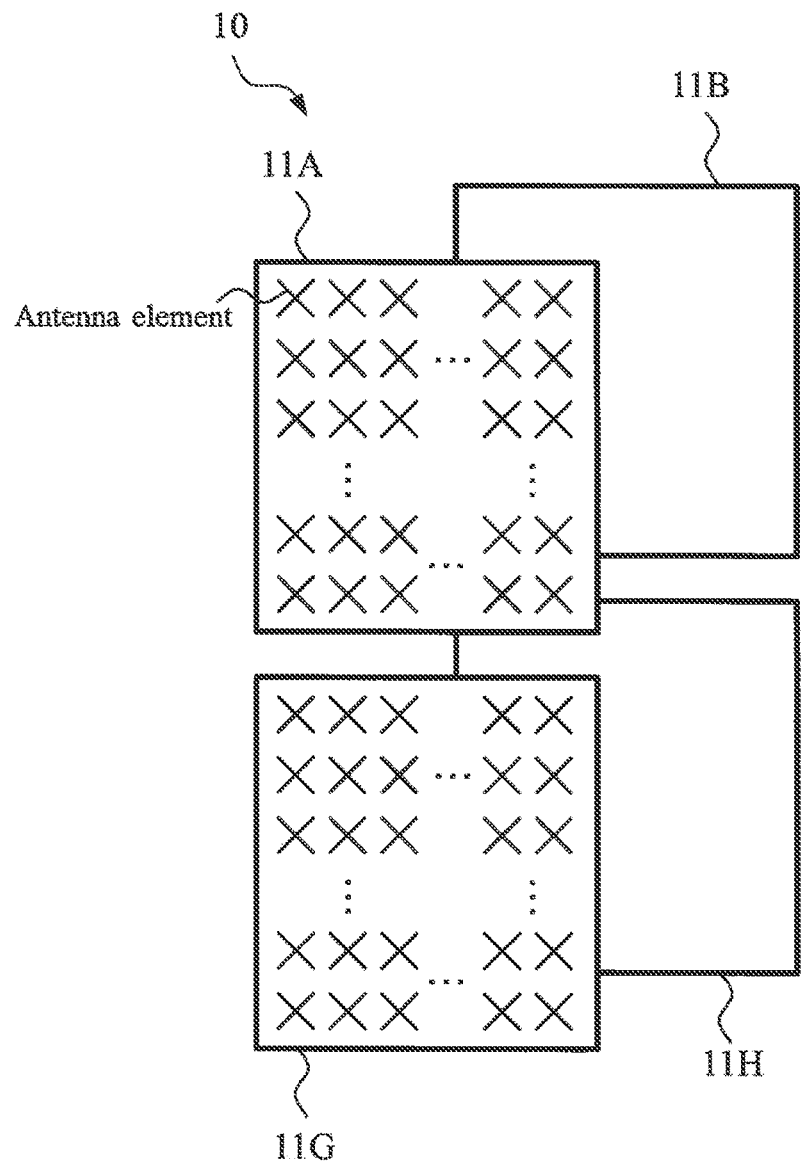
Figure 2E:
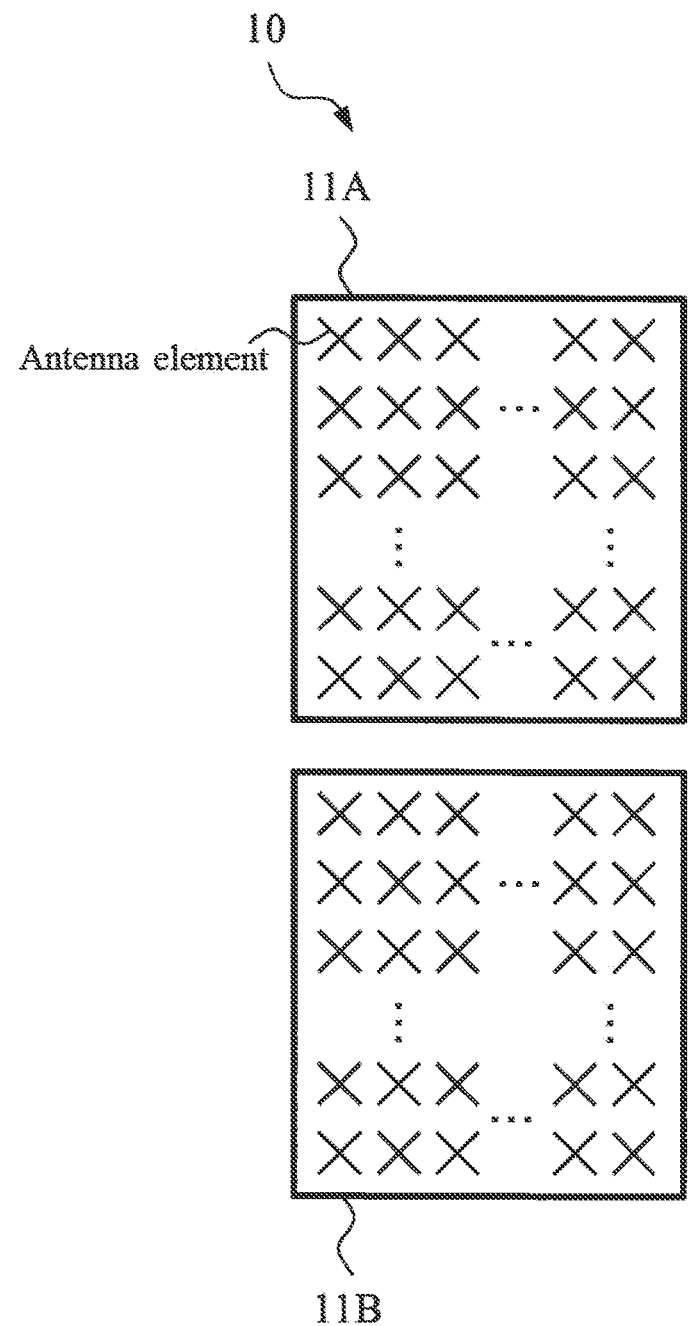

According to one or more embodiments of the present invention, the UE 10 may include multiple reception resources. In one or more embodiments of the present invention, the reception resource may be referred to as at least one of an antenna panel including multiple antennas (antenna ports), a group of multiple antennas, and a beam for the uplink transmission. For example, the reception resource may be antennas and corresponding beam. Each reception resource may have directivity different from each other. FIGS. 2A, 2B, 2C, 2D, and 2E are diagrams showing example deployment configurations of the multiple reception resources of the UE 10. For example, as shown in FIG. 2A, two reception resources 11A and 11B may be disposed on a front plane side and a back plane side in the UE 10, respectively. As shown in FIG. 2B, four reception resources 11A, 11B, 11C, and 11D may be disposed on the front plane side, the back plane side, and both lateral plane sides in the UE 10, respectively. As shown in FIG. 2C, six reception resources 11A, 11B, 11C, 11D, 11E, and 11F may be disposed on the front plane side, the back plane side, the both lateral plane sides, and both vertical plane sides in the UE 10, respectively. As another example, as shown in FIG. 2D, when the UE 10 includes four reception resources 11A, 11B, 11G, and 11H, two reception resources 11A and 11G may be disposed on the front plane side and other reception resources 11B and 11H may be disposed on the front plane side. As another example, as shown in FIG. 2E, both of the reception resources 11A and 11B may be disposed in the UE 10 so as to face the same direction. For example, when a user grips the UE 10 such as the smartphone so as to cover a lower side of the UE 10 with a user's hand, the configuration of FIG. 2E may be effective. However, the deployment configuration of the reception resources 11 of the UE 10 is not limited to the configuration set forth above. Furthermore, the number of the reception resources 11 of the UE 10 is not limited to two, four, six set for the above and may be more than six. In one or embodiments of the present invention, reception resources 11A, 11B, 11C, 11D, 11E, and 11F are also referred to antenna panels #1, #2, #3, #4, #5, and #6, respectively.

Figure 3A:
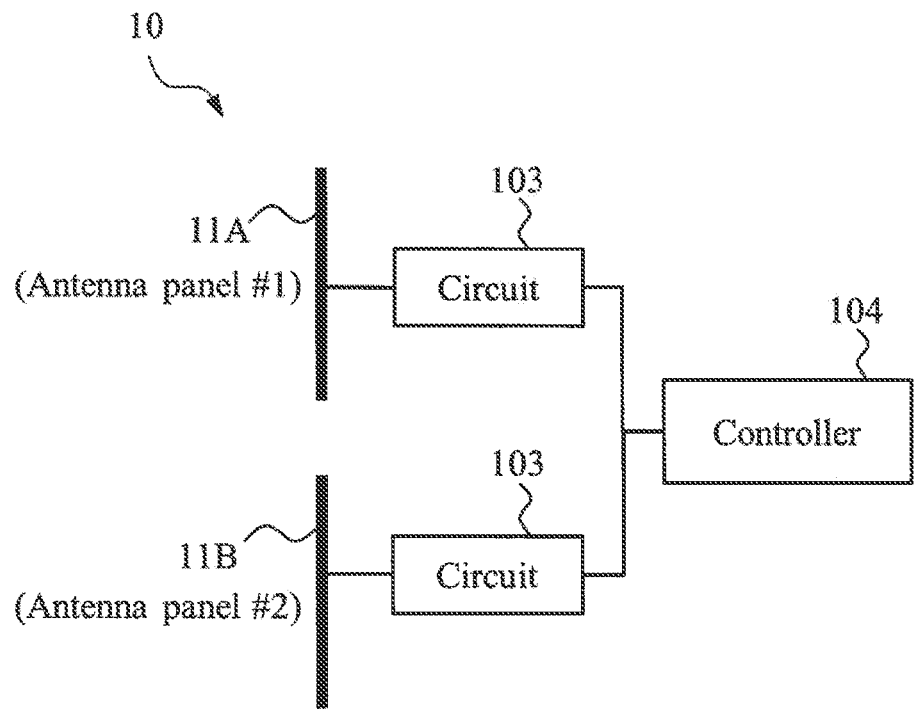
FIGS. 3A and 3B are diagrams showing example configurations of reception resources and circuit(s) in the UE according to one or more embodiments of the present invention.

Furthermore, as shown in FIG. 3A, for example, when the UE 10 includes two reception resources 11, in a configuration of the UE 10 according to one or more embodiments of the present invention, each circuit 103 may be connected to each of the reception resources 11A and 11B (antenna panels #1 and #2). Thus, in the UE 10, the number of the reception resources 11 may be the same as the number of the circuits 103.

Figure 3B:
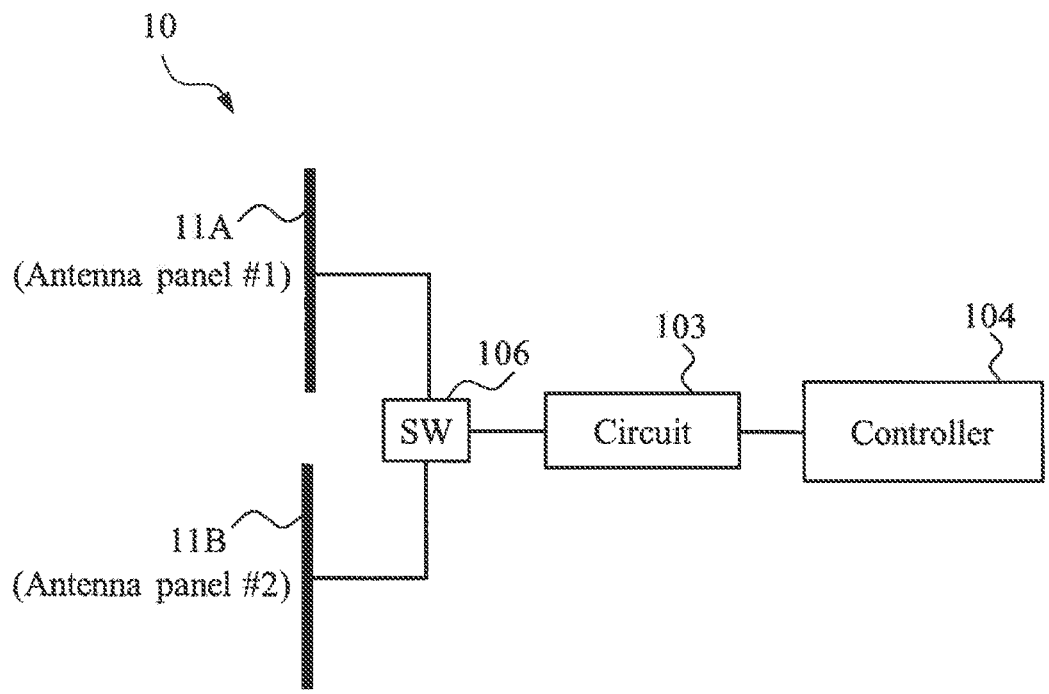

As another example, as shown in FIG. 3B, in a configuration of the UE 10 according to one or more embodiments of the present invention, the circuit 103 may be connected to two reception resources 11A and 11B via a switch (SW) 106.

Thus, in the UE 10, the number of the reception resources 11 may be greater than the number of the circuit 103.

First Example

Figure 4:
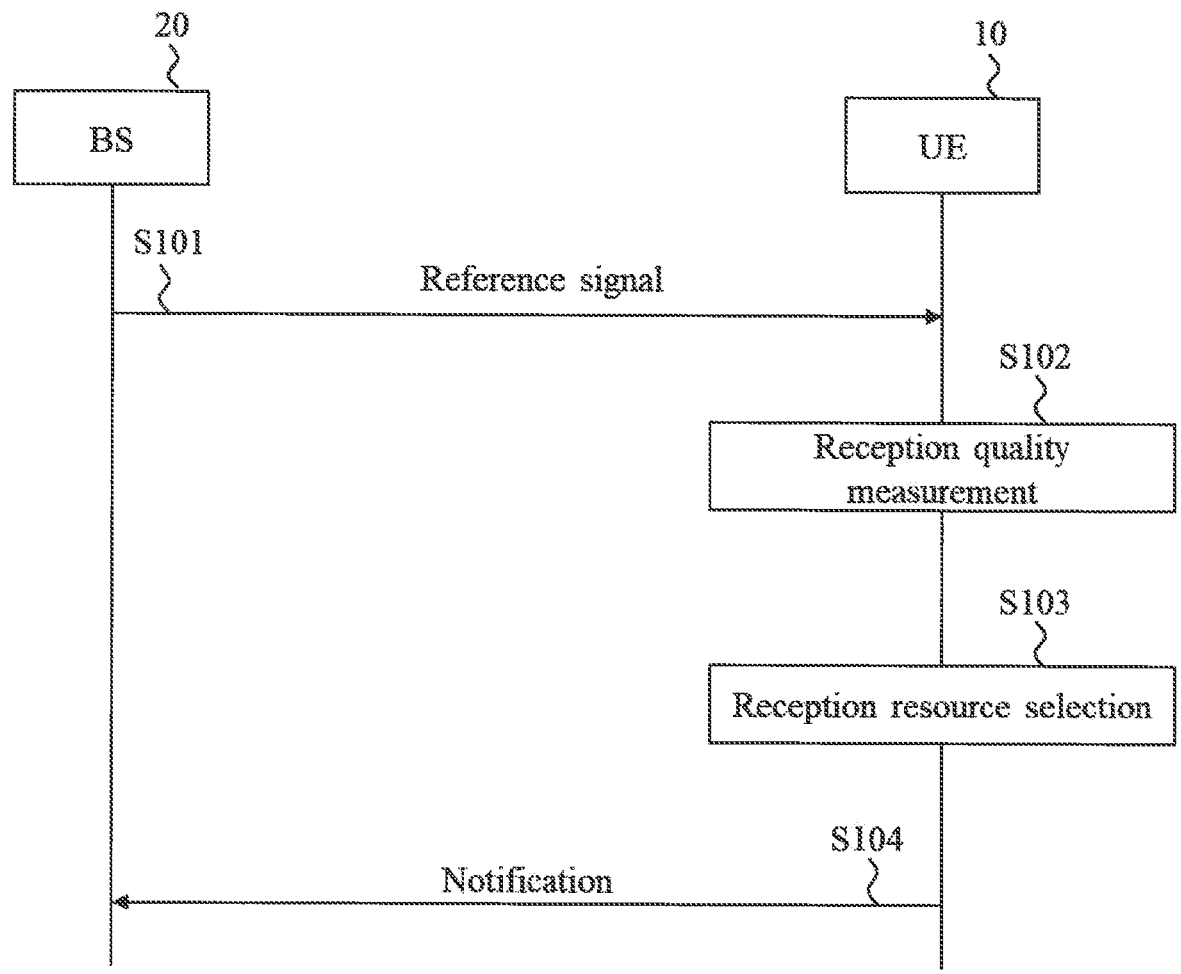
FIG. 4 is a sequence diagram showing an example operation for the reception resource selection using a downlink RS according to one or more embodiments of a first example of the present invention.

Embodiments of a first example of the present invention will be described below in detail with reference to FIG. 4. According to one or more embodiments of a first example of the present invention, the reception resource 11 of the UE 10 may be selected using a reference signal (RS) for reception resource selection. FIG. 4 is a sequence diagram showing an example operation for the reception resource selection using a downlink RS according to one or more embodiments of a first example of the present invention.

As shown in FIG. 4, the BS 20 may transmit a reference signal (RS) (predetermined signal) for the reception resource selection to the UE 10 (step S101). For example, the reference signal may be a Channel State Information Reference Signal (CSI-RS), a dedicated reference signal (DRS), a Cell-specific Reference Signal (CRS). The reference signal may be a newly defined signal. Furthermore, according to one or more embodiments of the present invention, the downlink RS is not limited to the RS for the reception resource selection, and may be a synchronization or other reference signals used for other purposes. Furthermore, for example, the UE may transmit, to the BS 20, a request for the RS transmission from the BS 20, and then the BS 20 may transmit the RS based on the request.

After the UE 10 may receive the reference signal from the BS 20 using the reception resource 11 of the UE 10, the UE 10 may perform reception quality measurements based on the received reference signal (step S102). The reception quality may be a received power such as Reference Signal Received Power (RSRP), Received Signal Strength Indicator (RSSI), path loss, or other information that reflects channel quality.

The UE 10 may select the reception resource 11 used for reception of a downlink signal or a channel based on the measurement results (step S103). For example, the UE 10 may select the reception resource 11 used for reception the reference signal having the reception quality is higher than a predetermined value of reception quality.

Then, the UE 10 may transmit a notification (selection information) for feedback to the BS 20 (step S104). For example, the notification may include information indicating the selected reception resource 11 and/or the reception quality of each reception resource 11. The information indicating the reception quality may be information indicating the reception resource 11 having the highest reception quality or a plurality of reception resources having higher reception quality than other reception resources 11. The reception resource 11 for the feedback may be indicated as a reception resource index (number). The reception resource 11 for the feedback may be transmitted as implicit information such as antenna port information, a precoding matrix indicator (PMI), and a CSI-RS resource indicator (CRI). Furthermore, in one or more embodiments of the present invention, the notification transmission may be optional, that is, the UE 10 may not transmit the notification to the BS 20. After the step S104, the UE 10 may receive a downlink signal (and/or downlink channel) from the BS 20 using the selected reception resource 11. For example, when the UE 10 receives the downlink signal from the BS 20, the UE 10 may determine the reception resource 11 by assuming that the BS 20 applies information in the notification indicating the selected reception resource 11 to the downlink signal transmission.

Furthermore, at the step S104, the information indicating the reception quality of the notification may be information indicating the reception quality such as the RSRP for each of the reception resources 11. For example, the notification may include the RSRP of one or more reception resources 11. Furthermore, the RSRP of a plurality of the reception resource 11 may be higher quality than other reception resources 11. Furthermore, when the notification includes the RSRP of a plurality of the reception resource 11, the RSRP may be indicated as difference between the highest RSRP and a predetermined RSRP.

Furthermore, at the step S104, the notification may include CSI feedback information in addition to the information indicating the selected reception resource(s) 11. For example, the notification may include a Rank Indicator (RI), the CRI, the PMI, and a Channel Quality Indicator (CQI) for the selected reception resource(s) 11. In such a case, for example, the RI, the CRI, the PMI, and the CQI may be calculated based on the selected panel(s) 11.

Furthermore, at the step S104, the information indicating the selected reception resource(s) 11 of the notification may be information indicating whether the reception resource 11 is switched or not rather than the reception resource index (number) of the selected reception resource 11.

Second Example

Figure 5:
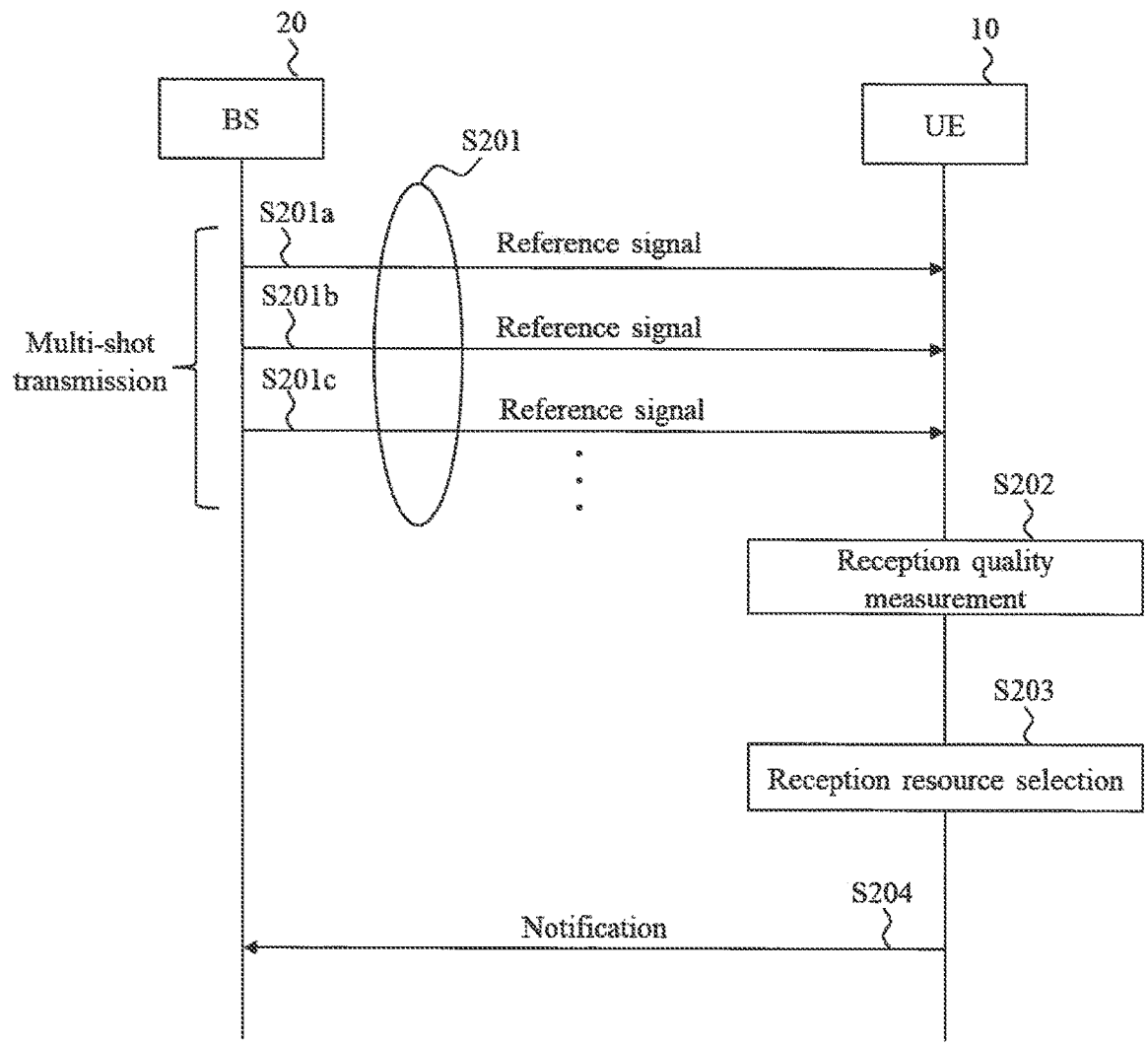
FIG. 5 is a sequence diagram showing an example operation for the reception resource selection using multiple downlink RSs (multi-shot transmission of RSs) according to one or more embodiments of a second example of the present invention.

Embodiments of a first example of the present invention will be described below in detail with reference to FIG. 5. For example, when the UE 10 comprise k reception resources 11, it is required that reception quality of k signals received by k reception resources 11 for the reception resource selection in the UE 10. That is, for example, when the number of reception resources 11 is greater than the number of the circuits 103 such as the configuration as shown in FIG. 3B, the reception resources 11 are required to be temporally switched. According to one or more embodiments of a second example of the present invention, a plurality of RSs are temporally transmitted from the BS 20 to the UE 10 (multi-shot transmission of the RSs), and then reception quality (channel quality) of the multiple reception resources 11 may be compared by the UE 10. FIG. 5 is a sequence diagram showing an example operation for the reception resource selection using multiple downlink RSs (multi-shot transmission of RSs) according to one or more embodiments of a second example of the present invention.

As shown in FIG. 5, the BS 20 may transmit multiple RSs (multiple predetermined signals) for the reception resource selection to the UE 10 (multi-shot transmission of the RSs) (step S201).

After the UE 10 may receive the multiple RSs from the BS 20 using the multiple reception resources of the UE 10, the UE 10 may perform reception quality measurements based on the received multiple RSs (step S202). For example, the UE 10 may compare the reception quality measurement results of each of the multiple RSs received by each of the reception resources 11.

The UE 10 may select at least one reception resource 11 based on the measurement results of the received multiple RSs (step S203). For example, the reception resource selection may be performed using the compared reception quality measurement results. For example, the UE 10 may select the reception resource 11 having the highest reception quality.

Then, the UE 10 may transmit the notification (selection information) for feedback to the BS 20 (step S204). The step S204 in FIG. 5 is the same as the step S104 in FIG. 4. The selection information may indicate the selected reception resource 11. After the step S204, the UE 10 may receive a downlink signal or a downlink channel using the selected reception resource.

Thus, according to one or more embodiments of the second example, the UE 10 may receive multiple RSs (predetermined signals) from the BS 20 using the multiple reception resources 11 of the UE 10. The UE 10 may measure reception quality of the RSs. The UE 10 may select, from the multiple reception resources 11, at least one reception resource 11 used for reception of the downlink signal(s) (and/or downlink channel(s)) based on the measured reception quality. For example, the UE 10 may select the reception resource 11 used for reception of the RS of which reception quality is higher than reception quality of the other RSs.

Modified Second Example

Figure 6:
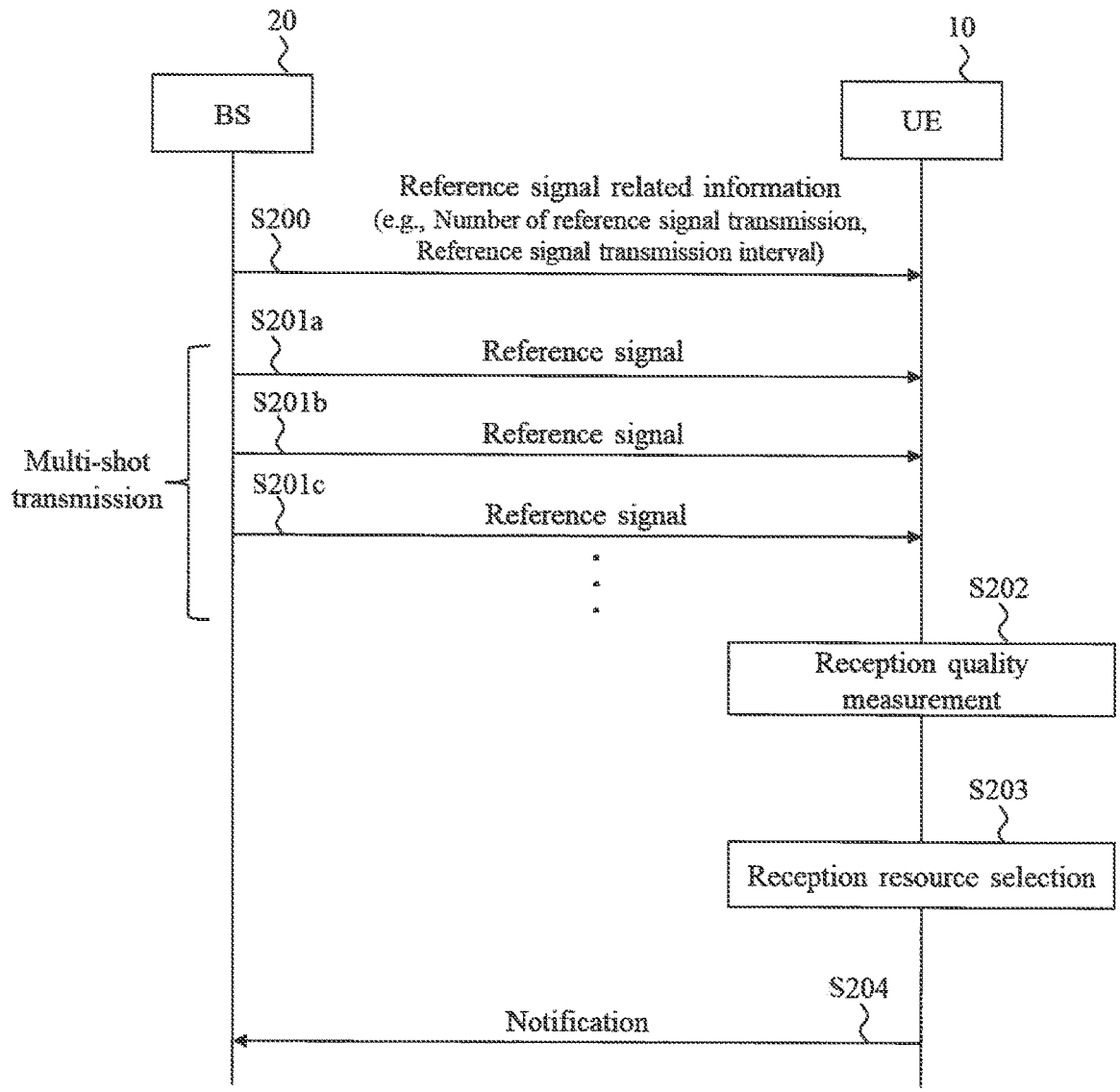
FIG. 6 is a sequence diagram showing an example operation for the reception resource selection using multiple downlink RSs (multi-shot transmission of RSs) according to one or more embodiments of a modified second example of the present invention.

According to one or more embodiments of a modified second example of the present invention, the BS 20 may notify the UE 10 of RS related information for the multiple RSs transmission. FIG. 6 is a sequence diagram showing an example operation for the reception resource selection using multiple downlink RSs (multi-shot transmission of RSs) according to one or more embodiments of a modified second example of the present invention. Similar steps in FIG. 6 to steps in FIG. 5 may have the same reference label.

As shown in FIG. 6, the BS 20 may transmit the RS related information to the UE 10 (multi-shot transmission of the RSs) (step S200). For example, the RS related information may include the number of the RS transmission and/or RS transmission interval (e.g., the number of subframes) for the multi-shot transmission. For example, the RS related information may be transmitted via at least one of semi-static signaling such as Radio Resource Control (RRC) signaling and dynamic signaling such as signaling using a Downlink control information (DCI).

For example, the number of the RS transmission may be indicated as a table of FIG. 7. As shown in FIG. 7, two bits may indicate a RS configuration number associated with the number of the RS transmission. For example, in FIG. 7, "00" indicates the RS configuration #1 with the number of the RS transmission (configured as "0" in this example), which means the RS is not transmitted. In FIG. 7, "01", "10", and "11" indicate RS configuration #2, #3, and #4, which are associated with the number of the RS transmission "1", "2", and "4", respectively.

The BS 20 may transmit multiple RSs for the reception resource selection to the UE 10 (multi-shot transmission of the RSs) (step S201).

The UE 10 may receive the multiple RSs from the BS 20 based on the RS related information, and then UE 10 may perform the reception quality measurements (S202) and the reception resource selection (S203). Then, the UE 10 may transmit the notification to the BS 20 (S204).

For example, at the step S201, multiple RSs may be allocated to the same location of a resource elements (RE) and may be transmitted using different subframes. As another example, the multiple RSs may be transmitted using the same subframe and may be allocated to different locations of the REs in the same subframe. In such a case, in order properly compare multiple panels, each of the REs to which the multiple RSs should not be overlapped in a time domain. For example, the UE 10 may not assume that the REs overlapped in the time domain are configured for the multi-shot transmission of RSs. Furthermore, the reception resource switching may require transition time. In such a case, the UE 10 may not assume that the multiple RSs are multiplexed within a predetermined period.

Figure 8:
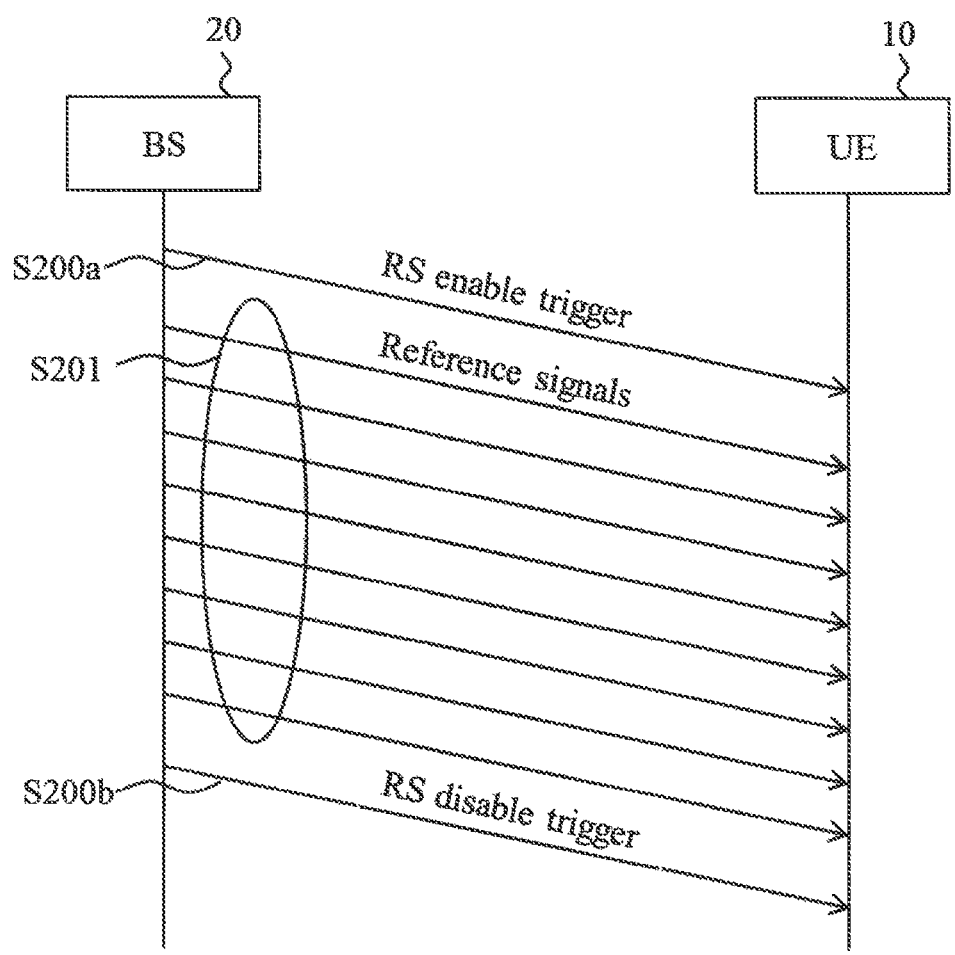
FIG. 8 is a sequence diagram showing an example operation for multiple downlink RSs (multi-shot transmission of RSs) for the reception resource selection according to one or more embodiments of a modified second example of the present invention.

As another example, according to one or more embodiments of a modified second example of the present invention, the BS 20 may notify the UE 10 of information to enable/disable periodic RS transmission. As shown in FIG. 8, the BS 20 may transmit a RS enable trigger (trigger information) to the UE 10 before the RS transmission (step S200a). The RS enable trigger (trigger information) may indicate on/off of the multi-shot RSs (e.g., multi-shot CSI-RSs) transmission. Then, the BS 20 may transmit the RSs (step S201). The step S201 in FIG. 8 is the same as the step 201 in FIGS. 5 and 6. The BS 20 may transmit a RS disable trigger to the UE 10 (step S200b). For example, the UE 10 may assume the RSs are multiplexed after a lapse of a predetermined time offset from the RS enable trigger. In such a case, the predetermined time offset may be zero. For example, the UE 10 may assume the RSs are not multiplexed after a lapse of a predetermined time offset from the RS disable trigger. In such a case, the predetermined time offset may be zero. For example, the BS 20 may perform different transmit power control (TPC) for each of the multi-shot RSs.

As another example, according to one or more embodiments of a modified second example of the present invention, in the multi-shot transmission of the RSs, a frequency band on which the RS is multiplexed may be hopped for each RS transmission. As a result, broad band channel estimation may be effectively estimated.

As another example, according to one or more embodiments of a modified second example of the present invention, in the multi-shot transmission of the RSs, transmission antenna ports of the BS 20 used for the RS transmission may be switched.

Figure 9:
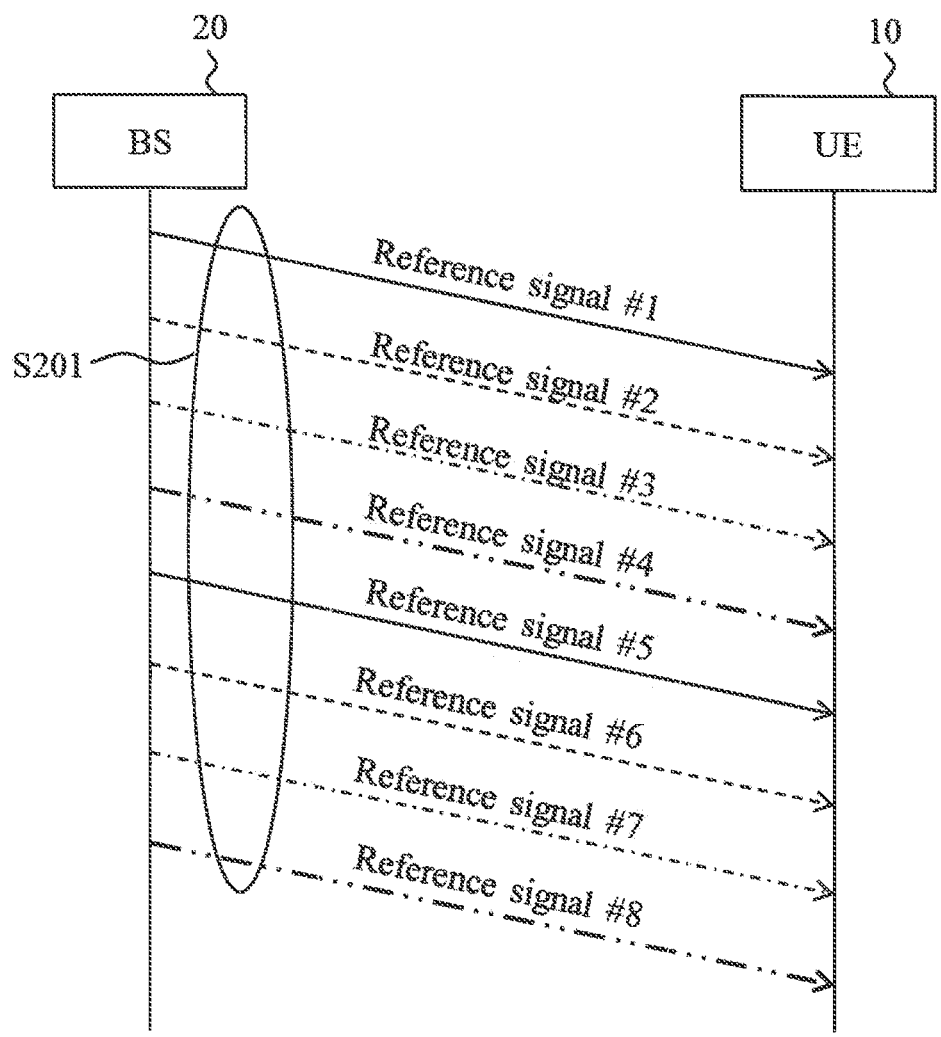
FIG. 9 is a sequence diagram showing an example operation for multiple downlink RSs (multi-shot transmission of RSs) for the reception resource selection according to one or more embodiments of a modified second example of the present invention.

As another example, according to one or more embodiments of a modified second example of the present invention, in the multi-shot transmission of the RSs, measurement results (for example, the reception quality measurement result) of the multiple RSs may be allowed to be averaged or may not be allowed to be averaged in the UE 10. Furthermore, the BS 20 may transmit, to the UE 10, information indicating whether the measurement result is allowed to be averaged. Furthermore, the measurement result may be allowed to be averaged periodically, as shown in FIG. 9. As shown in FIG. 9, for example, each of pairs of RSs #1 and #5, RSs #2 and #6, RSs #3 and #7, and RSs #4 and #8 may be transmitted with a predetermined periodicity. In FIG. 9, for example, the measurement result of the pair of RSs #1 and #5 and RSs #4 and #8 may be averaged. On the other hand, the measurement result of the pair of RSs #2 and #6 and RSs #3 and #7 may be not be averaged. Furthermore, the predetermined periodicity of the RSs, of which the measurement result is allowed to be averaged, may be transmitted from the BS 20 to the UE 10.

Furthermore, information related to the multi-shot transmission of the RSs (e.g., the information indicating whether the measurement result is allowed to be averaged and the predetermined periodicity) may include a CSI process and Non Zero Power (NZP) CSI-RS configuration information.

Figure 10A:
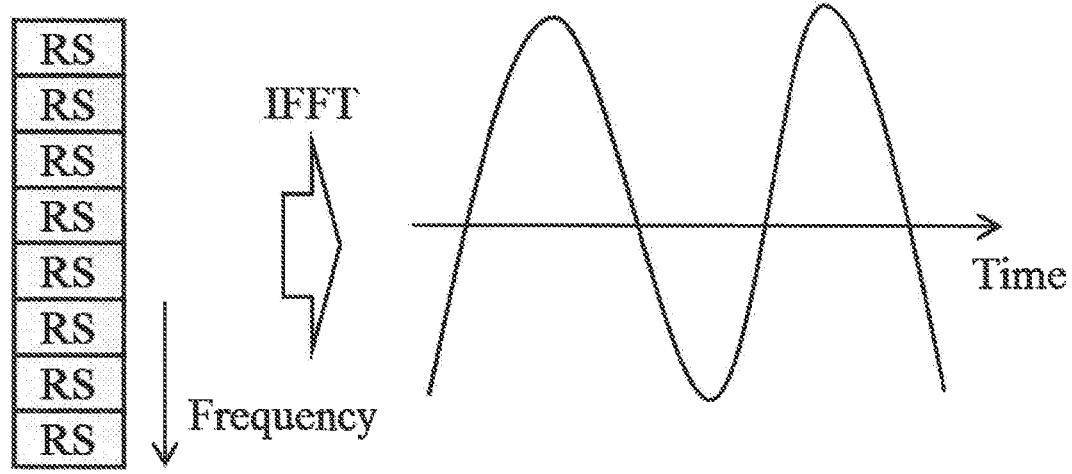
FIG. 10A is a diagram showing a configuration where the RSs are continuously multiplexed on frequency resources according to one or more embodiments of a modified second example of the present invention.
Figure 10B:
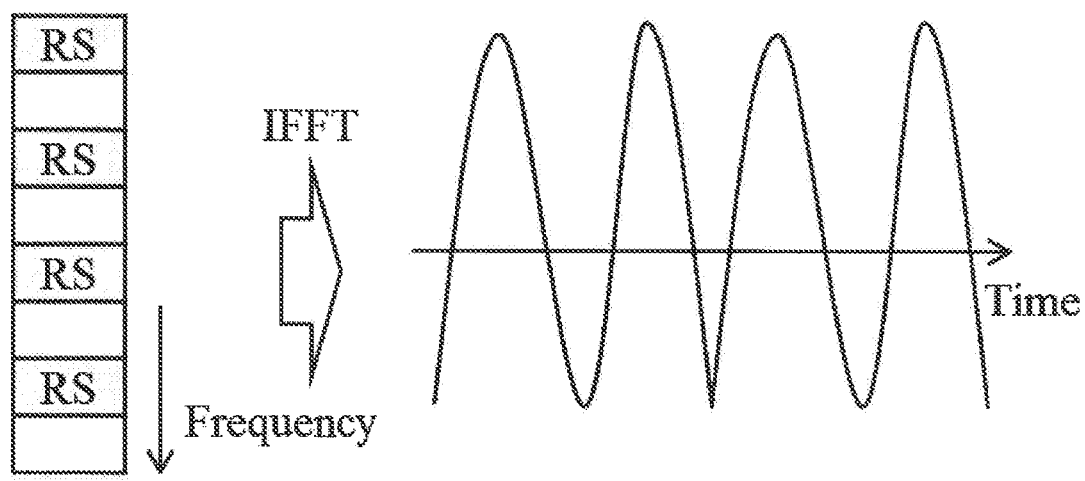
FIG. 10B is a diagram showing a configuration where the RSs are multiplexed on frequency resources in a comb-like pattern according to one or more embodiments of a modified second example of the present invention.

In an Orthogonal frequency-division multiplexing (OFDM) system, when a multiplexing interval in a frequency domain increases by predetermined frequency period, e.g., subcarrier, the number of repetition of a time signal increases by the predetermined times. According to one or more embodiments of a modified second example of the present invention, using the above characteristics in the OFDM system, time multiplexing density may be increased. For example, as shown in FIG. 10A, the RSs are continuously multiplexed on frequency resources. On the other hand, as shown in FIG. 10B, the RSs are multiplexed on the frequency resource in a comb-like pattern. As a result, in FIG. 10B, the time multiplexing density of the RS transmission can be increased and the multi-shot transmission of the RSs may be realized.

As another example, according to one or more embodiments of a modified second example of the present invention, for example, when the number of reception resources 11 is the same as the number of the circuits 103 such as the configuration as shown in FIG. 3A, the reception resources 11 are required to be switched based on a single reference signal sequence.

Third Example

Figure 11:
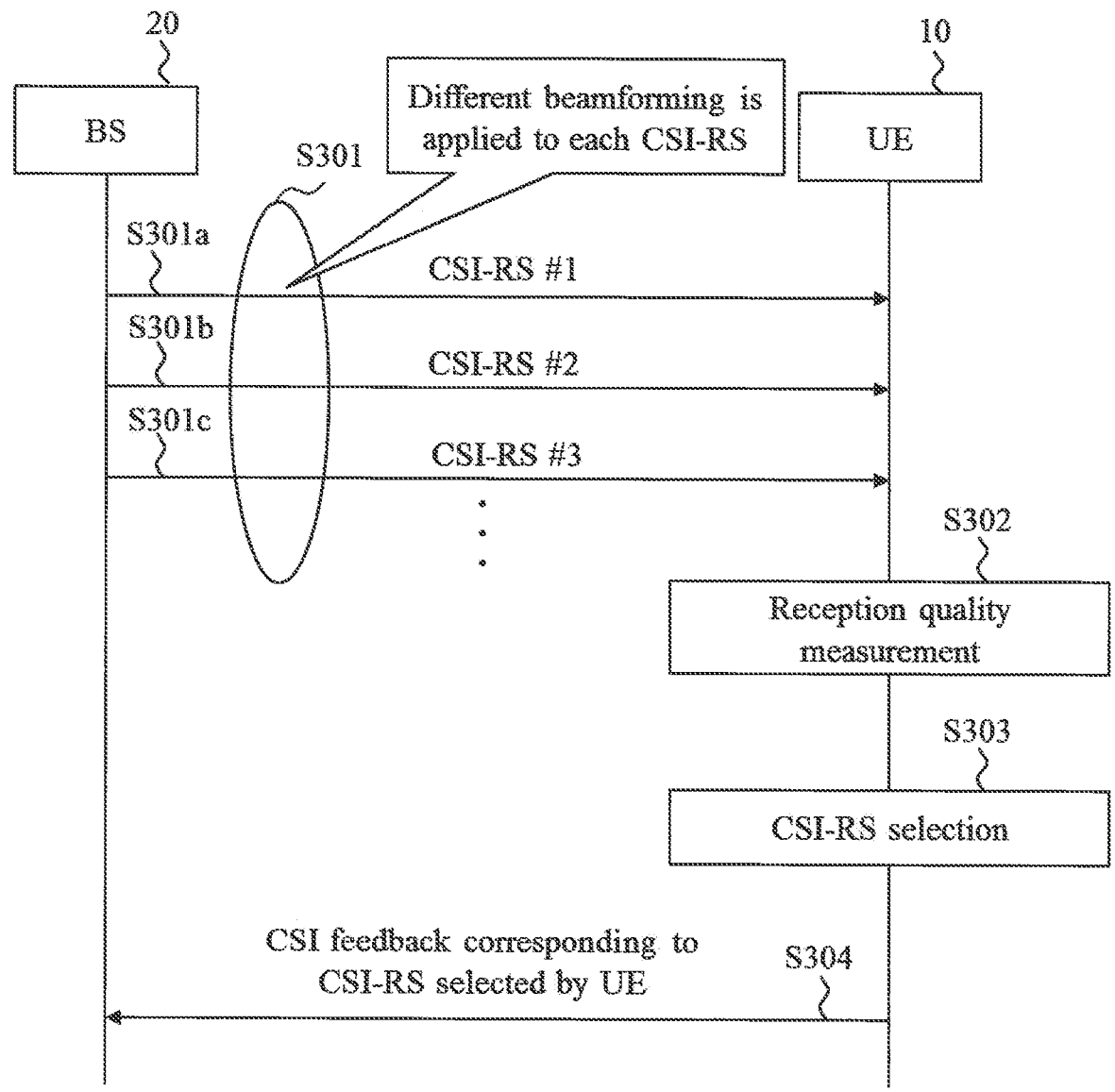
FIG. 11 is a sequence diagram showing an example operation for multiple RSs (multi-shot transmission of RSs) according to one or more embodiments of a third example of the present invention.

Embodiments of a third example of the present invention will be described below in detail with reference to FIG. 11. FIG. 11 is a sequence diagram showing an example operation for the reception resource selection using multiple downlink RSs (multi-shot transmission of RSs) according to one or more embodiments of the third example of the present invention.

As shown in FIG. 11, the BS 20 may transmit multiple CSI-RSs to the UE 10 (step S301). In one or more embodiments of the third example of the present invention, different beamforming may be applied to each of the multiple CSI-RSs. Furthermore, for example, the BS 20 may notify the UE 10 of designation of operations of the CSI-RS feedback in the UE 10 before the multiple CSI-RSs transmission.

After the UE 10 may receive the multiple CSI-RSs from the BS 20, the UE 10 may perform reception quality measurements based on the received multiple CSI-RSs (step S302). The UE 10 may select the CSI-RS(s) based on the measurement results of the received multiple RSs (step S303).

The UE 10 may transmit the CSI feedback corresponding to the selected CSI-RS to the BS 20 (step S304). Furthermore, the UE 10 may transmit information of the CSI related to the selected CSI-RS.

Modified Third Example

According to one or more embodiments of a modified third example of the present invention, the multi-shot transmission of the CSI-RSs may be applied to a beam sweeping. For example, beams from a transmitter may be determined using the multi-shot transmission of the CSI-RSs. For example, as shown in FIG. 12, different beamforming may be applied to each of the multiple beams and the transmitter (e.g., BS 20) may transmit the multiple CSI-RSs using the multiple beams (first scheme).

Figure 12:
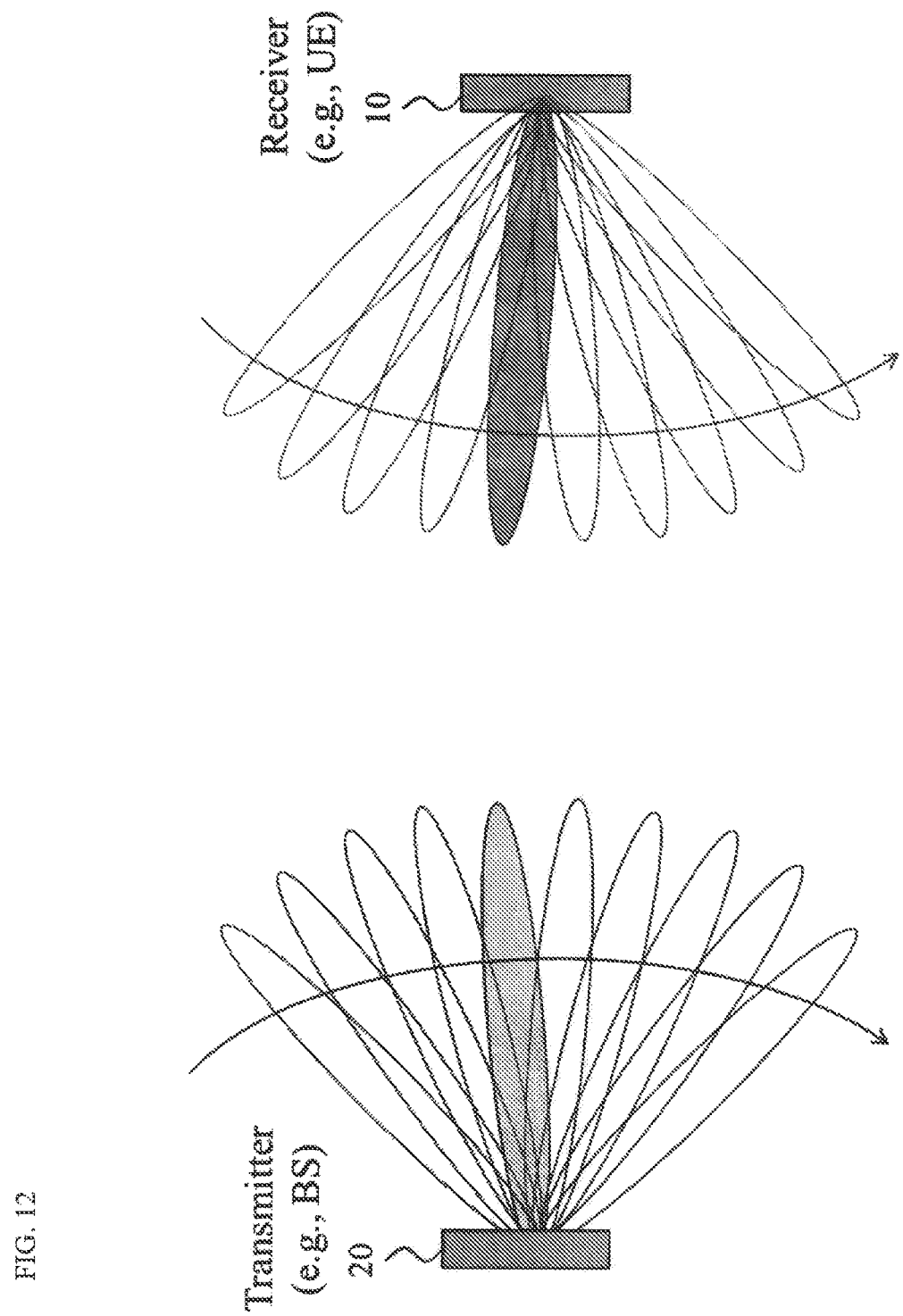
FIG. 12 is a diagram showing an example operation for multiple RSs (multi-shot transmission of RSs) for beam sweeping according to one or more embodiments of a modified third example of the present invention.

Furthermore, for example, the transmitter may transmit the multiple CSI-RSs to which the same beam is applied, and, as shown in FIG. 12, a receiver (e.g., UE 10) may apply select a proper beam for the receiver side (second scheme).

As another example, for example, above the first and second schemes may be combined. Furthermore, the BS 20 may transmit, to the UE 10, information indicating whether the same beamforming vector is applied to the multi-shot CSI-RSs or not. In general, the BS 20 may transmit, to the UE 10, information indicating whether the multi-shot CSI-RSs are comparable or not.

Fourth Example

According to one or more embodiments of a fourth example of the present invention, the BS 20 may notify the UE 10 of designation of the UE operation.

Figure 13A:
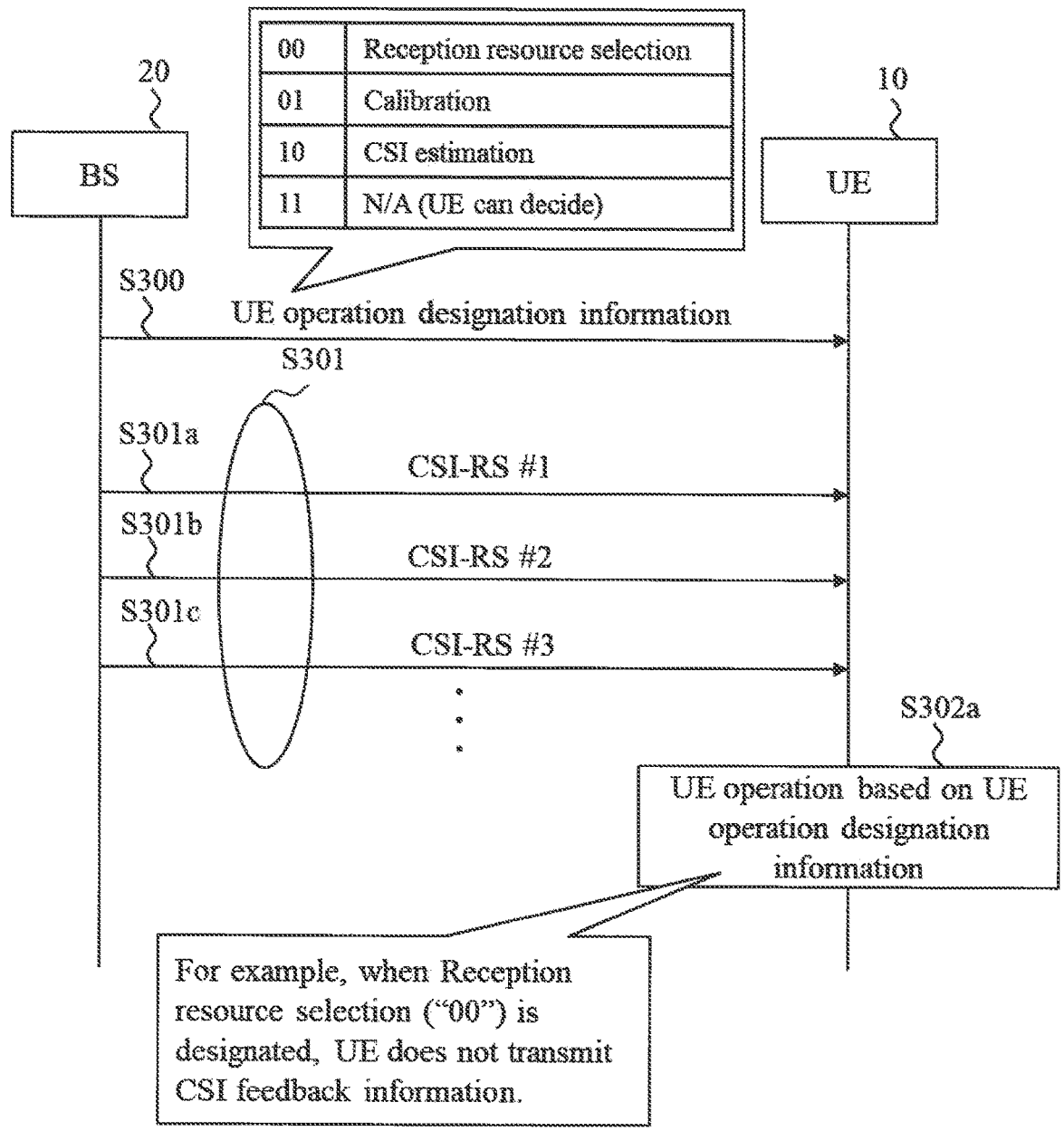
FIG. 13A is a sequence diagram showing an example operation for reception resource selection using multiple downlink RSs (multi-shot transmission of RSs) according to one or more embodiments of a fourth example of the present invention.

As shown in FIG. 13A, the BS 20 may transmit UE operation designation information to the UE 10. The UE operation designation information may include information to designate Antenna panel selection (two bits "00"), Calibration ("01"), CSI estimation ("10"), and N/A (UE can decide) ("11") (step S300). The designated operation of the UE operation designation information is not limited to above operations as shown in FIG. 13A, and may be information to designate other operations or a combination of operations such as "Antenna panel selection" and "Calibration." The UE operation designation information may be included in a CSI-RS feedback trigger, a RS transmission trigger, or DL/UL grant. Then, the BS 20 may the multiple CSI-RSs (step S301). For example, the BS 20 may designate a type of the CSI for feedback from the UE 10 using the UE operation designation information or another signaling. For example, the type of the CSI designated by the BS 20 may be a CSI type (e.g., RI/PMI/CRI/CQI) and/or a bandwidth of the CSI feedback.

After the UE 10 may receive the multiple CSI-RSs from the BS 20, the UE 10 may perform the operation designated in the UE operation designation information (step S302a). For example, when the Antenna panel selection ("00") is designated, UE may perform the reception resource selection and may not transmit CSI feedback information.

As another example, the BS 20 may transmit information indicating the CSI feedback is not performed via at least one of semi-static signaling such as the RRC signaling and dynamic signaling such as the signaling using the DCI format.

Figure 13B:
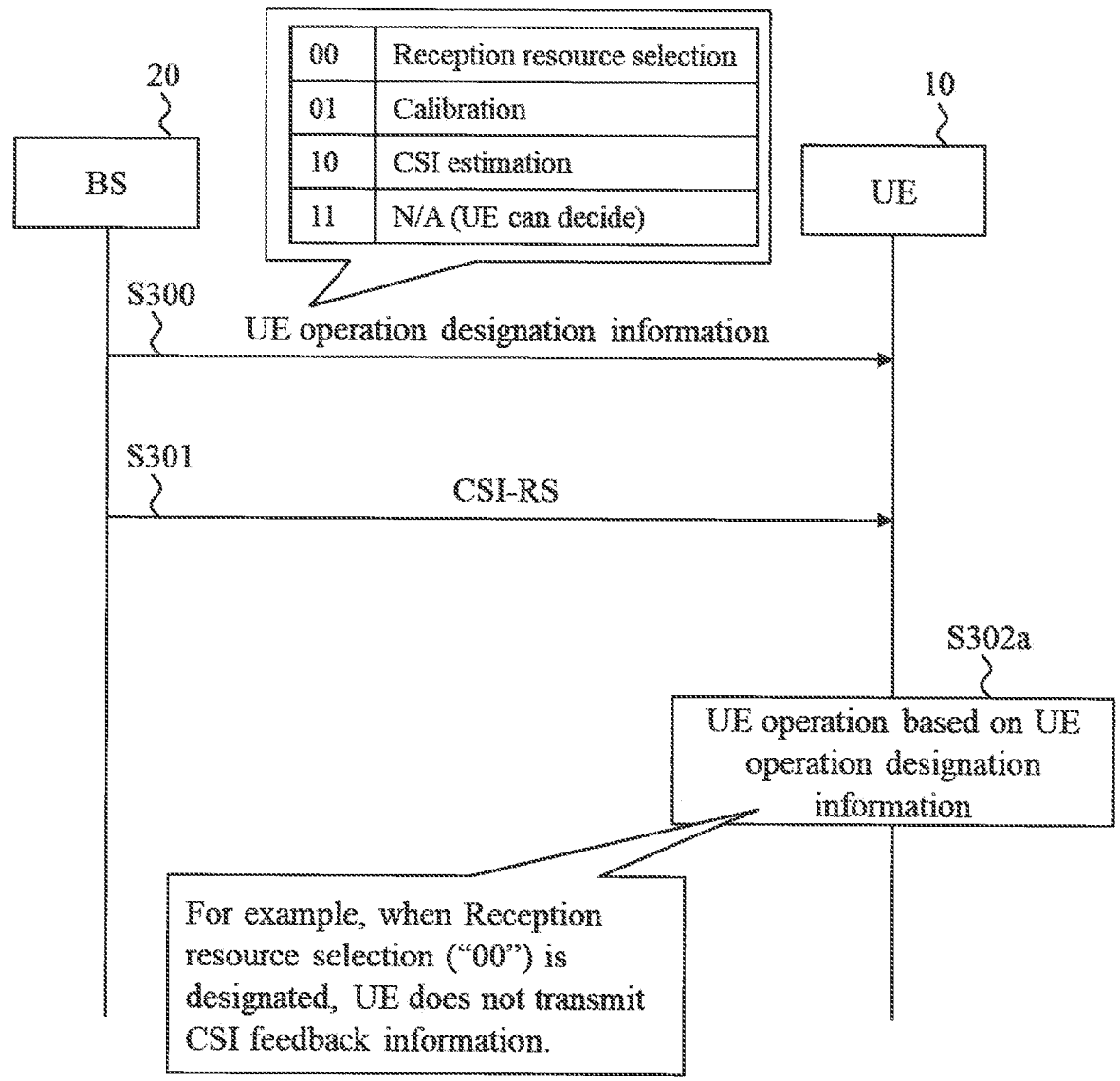
FIG. 13B is a sequence diagram showing an example operation for reception resource selection using a downlink RS according to one or more embodiments of a modified fourth example of the present invention.

As another example, according to one or more embodiments of a modified fourth example of the present invention, the UE operation designation information transmission is not limited to be applied to the multiple CSI-RSs transmission and may be applied to a CSI-RS transmission as shown in FIG. 13B or other RS(s) transmission.

Fifth Example

Figure 14:
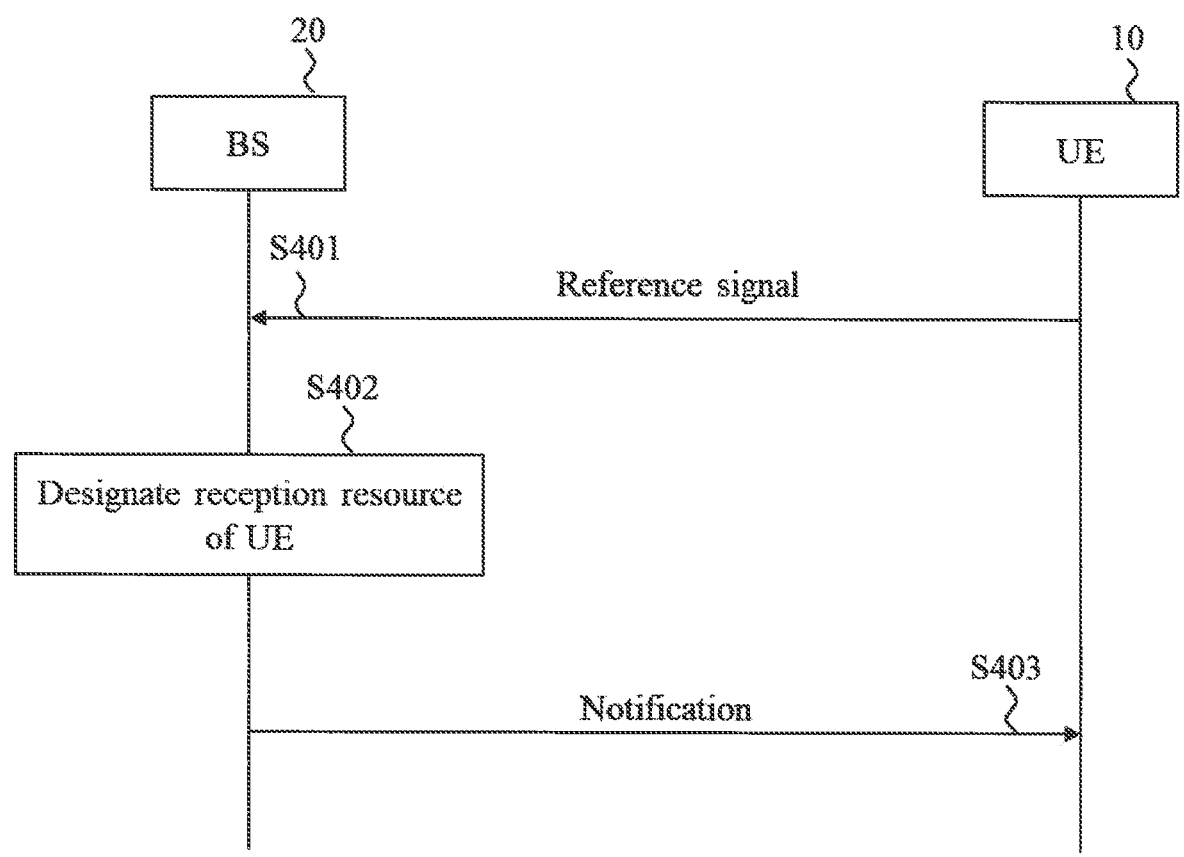
FIG. 14 is a sequence diagram showing an example operation for reception resource selection using an uplink RS according to one or more embodiments of a fifth example of the present invention.

Embodiments of a fifth example of the present invention will be described below in detail with reference to FIG. 14. According to one or more embodiments of the fifth example of the present invention, the reception resource 11 of the UE 10 may be designated (selected) by the BS 20 using an uplink RS(s) for reception resource selection. FIG. 14 is a sequence diagram showing an example operation for the reception resource selection using an uplink RS according to one or more embodiments of the fifth example of the present invention.

As shown in FIG. 14, the UE 10 may transmit the uplink RS to the BS 20 from all or part of the multiple reception resources 11 (step S401). The BS 20 may designate (select) the reception resource 11 of the UE 10 from which the uplink RS has the highest quality based on the received uplink RS from the UE 10 (step S402). Then, the BS 20 may transmit a notification indicating the designated reception resource 11 to the UE 10 (step S403). The UE 10 may receive signals using the reception resource 11 selected by the BS 20 based on the notification. Furthermore, the features of embodiments of the fifth example of the present invention can be applied to embodiments of the first to third examples of the present invention.

As another example, the UE 10 may determine the reception resource 11 used for reception of a downlink signal by assuming that the BS 20 applies feedback information (notification) indicating the selected reception resource 11 to the downlink signal transmission.

Sixth Example

According to one or more embodiments of the present invention, the UE 10 may notify the BS 20 of the number of the reception resources 11 of the UE 10.

Figure 15:
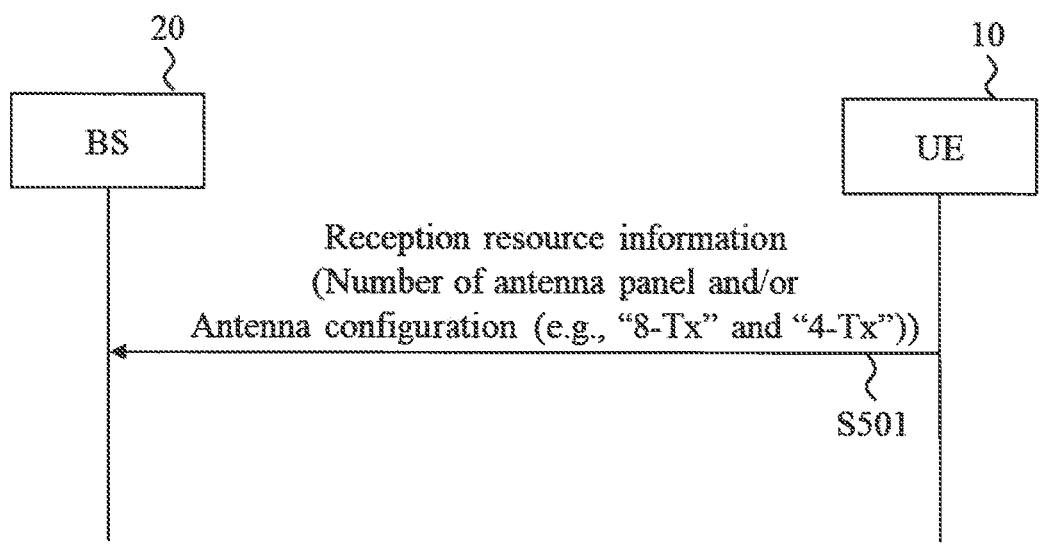
FIG. 15 is a sequence diagram showing an example operation for reception resource selection according to one or more embodiments of a sixth example of the present invention.

As shown in FIG. 15, the UE 10 may transmit reception resource information to the BS 20 (step S501). The reception resource information may include at least one of the number of the reception resource 11 of the UE 10, the number of the reception resources which are simultaneously able to transmit and/or receive signals, and an antenna configuration of the reception resource 11. For example, the reception resource information may be transmitted as UE capability information. For example, the reception resource information may include the number of TXRU, the number of streams, and a transport block size. For example, the number of TXRU, the number of streams, and a transport block size may be for each reception resource 11. The reception resource index may be assigned to each reception resource 11. For example, the reception resource information may be used for the reception resource selection in the BS 20 such as the step S402 in FIG. 14. Furthermore, the features of embodiments of the sixth example of the present invention can be applied to embodiments of the first to fifth examples of the present invention.

Furthermore, the antenna configuration of the reception resource 11 may be for each reception resource 11. For example, the antenna configuration may be indicated as 8-Tx and 4-Tx, which mean the UE 10 includes two reception resources 11 consist of the 8-Tx reception resource and the 4-Tx reception resource. For example, the antenna configuration of the reception resource 11 may include all or part of the number of the planer (vertical/horizontal) antennas and polarized antennas for each reception resource 11. For example, the antenna configuration may be transmitted from the UE 10 to the BS 20 as the applied codebook. Furthermore, the antenna configurations of the multiple reception resources 11 may be assumed as identical in the BS 20.

Furthermore, the number of the reception resources 11 which can be transmitted by the UE 10 may be limited. For example, when the UE 10 includes 16 reception resources, the UE may select the number of the reception resources 11 among predetermined candidates: e.g., (1, 2), (1, 2, 3, 4), (1, 2, 4, 6), (1, 2, . . . , 5, 6), (1, 2, . . . , 7, 8), (1, 2, 3, 4, 6, 8, 12, 16), (1, 2, 3, 4, . . . , 15, 16) for the notification to the BS 20. One or more reception resources 11 of the predetermined candidates may be determined based on regularity or at random.

Another Example

For example, when radiation directions of the multiple reception resources 11 are the same (or almost the same), the common operations according to embodiments of the first to sixth examples of the present invention may be applied to all or part of the reception resources 11. As another example, multiple reception resources 11 (or antenna group) may be grouped. For example, each antenna group may apply the same above operations.

As another example, a common reception resource 11 may be used for a plurality of physical channels and signals. As another example, the common reception resource 11 may be used for the uplink and the downlink transmission. As another example, the reception resource selection may be performed based on the CSI or Radio Resource Management (RRM) measurements.

(Configuration of Base Station)

Figure 16:
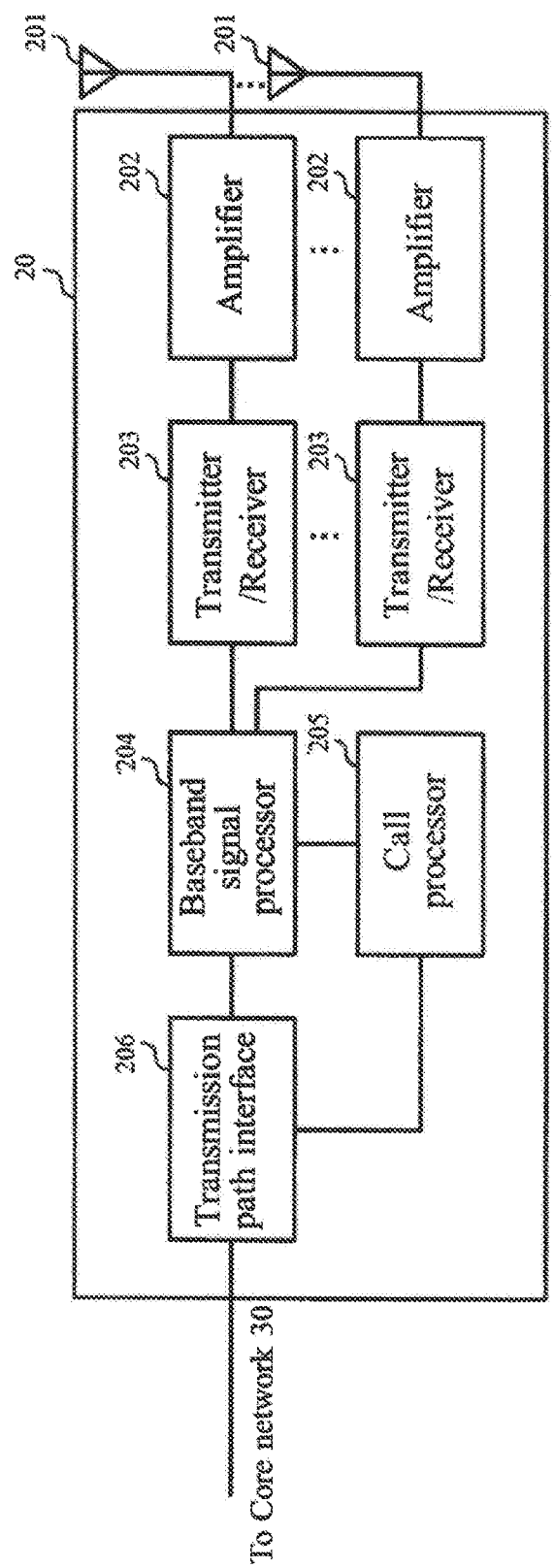
FIG. 16 is a block diagram showing a schematic configuration of a base station according to one or more embodiments of the present invention.

The BS 20 according to one or more embodiments of the present invention will be described below with reference to FIG. 16. FIG. 16 is a diagram illustrating a schematic configuration of the BS 20 according to one or more embodiments of the present invention. The BS 20 may include a plurality of antennas 201, amplifier 202, transceiver (transmitter/receiver) 203, a baseband signal processor 204, a call processor 205 and a transmission path interface 206.

User data that is transmitted on the DL from the BS 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., RRC signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the BS 20, and manages the radio resources.

(Configuration of User Equipment)

Figure 17:
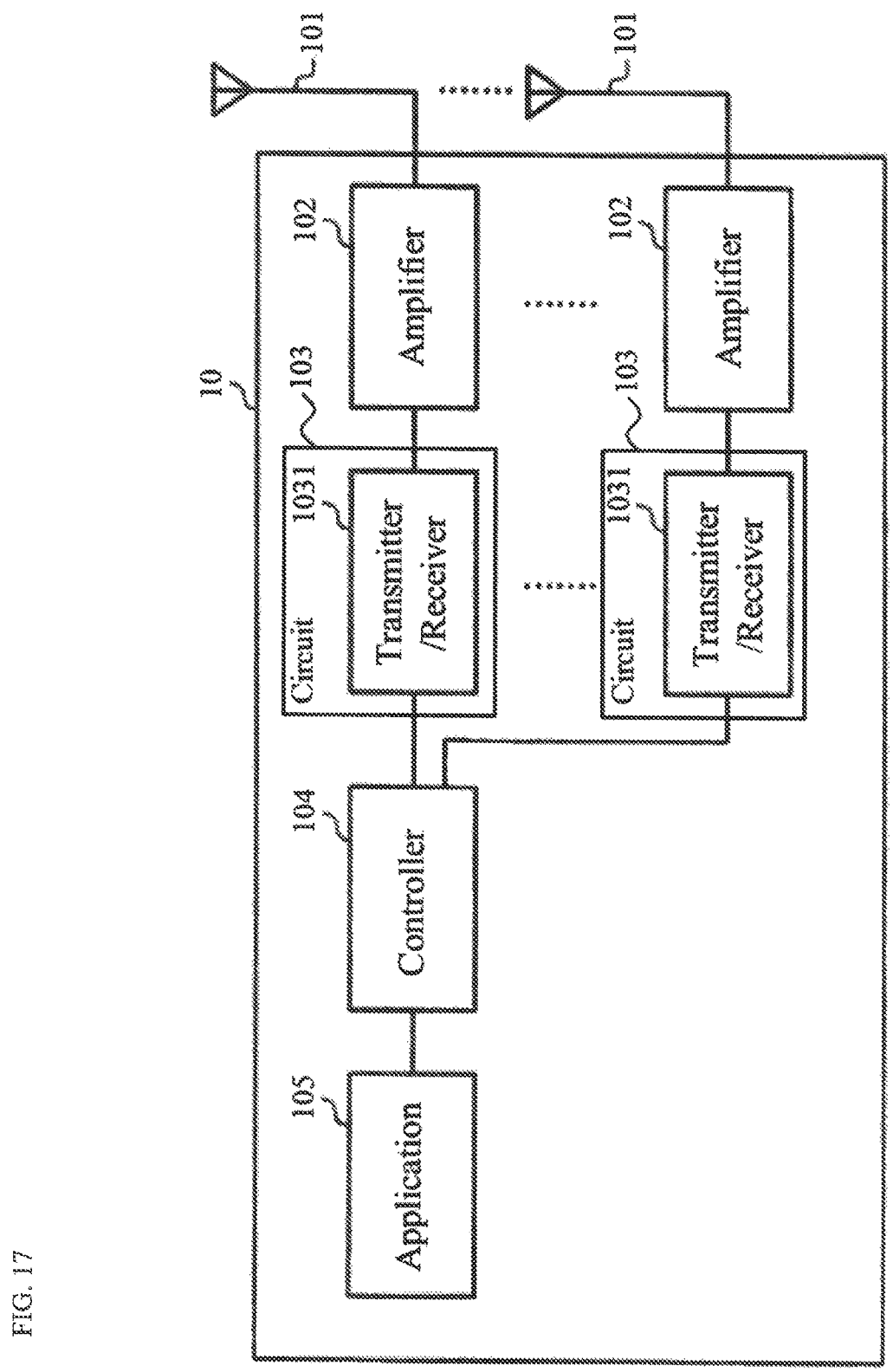
FIG. 17 is a block diagram showing a schematic configuration of a user equipment according to one or more embodiments of the present invention.

The UE 10 according to one or more embodiments of the present invention will be described below with reference to FIG. 17. FIG. 17 is a schematic configuration of the UE 10 according to one or more embodiments of the present invention. The UE 10 has a plurality of UE antennas 101, amplifiers 102, the circuit 103 comprising transceiver (transmitter/receiver) 1031, the controller 104, and an application 105.

As for DL, radio frequency signals received in the UE antennas 101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

In one or more embodiments of the present invention, the reception resource may be replaced with an antenna group or another concept such as another antenna dimension (e.g., N3) in addition to the number of the vertical, horizontal, and polarized antennas. In one or more embodiments of the present invention, an index to group a plurality of antenna ports (for each reception resource) may be introduced.

Although the present disclosure mainly described examples of uplink transmission, the present invention is not limited thereto. One or more embodiments of the present invention may apply to downlink transmission. Furthermore, one or more embodiments of the present invention may apply to methods for transmitting and receiving signals. For example, a method of the reception resource selection in the UE may apply to a method of reception resource selection in the BS.

One or more embodiments of the present invention may be used for each of the uplink and the downlink independently. One or more embodiments of the present invention may be also used for both of the uplink and the downlink in common. For example, the reception resource selection may be performed for each of the uplink and the downlink independently or for both of the uplink and the downlink in common.

One or more embodiments of the present invention may be used for each physical channel (or physical signal) independently. One or more embodiments of the present invention may be also used for a plurality of physical channels (or physical signals) in common. For example, the reception resource selection may be performed for each physical channel (or physical signal) independently or for a plurality of physical channels (or physical signals) in common.

Although the present disclosure mainly described examples of physical channels and physical signals such as the PUSCH, the SRS, the PUCCH, the PRACH, and the DM-RS, the present invention is not limited thereto. One or more embodiments of the present invention may apply to another channel and signal.

Although the present disclosure mainly described examples of a channel and signaling scheme based on LTE/LTE-A, the present invention is not limited thereto. One or more embodiments of the present invention may apply to another channel and signaling scheme having the same functions as LTE/LTE-A, New Radio (NR), and a newly defined channel and signaling scheme.

Although the present disclosure mainly described examples of the UE including planer antennas, the present invention is not limited thereto. One or more embodiments of the present invention may also apply to the UE including one dimensional antennas and predetermined three dimensional antennas.

In one or more embodiments of the present invention, it may not be required that each of the multiple reception resources has different directivity from each other. One or more embodiments of the present invention may also apply to the multiple reception resources have the same directivity.

The above examples and modified examples may be used for not only the reception resource selection but also other operations. For example, the above examples and modified examples may be used for cell selection (initial cell connection, handover, and cell reselection) and CSI estimation.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCES

1 Wireless communication system
10 User equipment (UE)
11 Antenna panel
101 Antenna
102 Amplifier
103 Circuit
1031 Transceiver (transmitter/receiver)
104 Controller
105 Application
106 Switch
20 Base station (BS)
201 Antenna
202 Amplifier
203 Transceiver (transmitter/receiver)
204 Baseband signal processor
205 Call processor
206 Transmission path interface

What is claimed is:
1. A user equipment (UE) comprising:
a receiver that receives, from a base station (BS), information regarding repetition of Channel State Information-Reference Signals (CSI-RSs), the CSI-RSs transmitted with a beam within a transmission period; and
a processor that controls to receive the CSI-RSs, from the BS, based on the information, within the transmission period,
wherein, when the information regarding repetition of CSI-RSs indicates off, the processor controls to receive the CSI-RSs, from the BS, transmitted with respectively different beams within the transmission period.

2. The UE according to claim 1,
wherein the receiver receives information regarding a CSI report, and
wherein, when the information regarding the CSI report instructs not to perform the CSI report, the processor controls not to perform the CSI report.

3. The UE according to claim 1, wherein the information is transmitted by Radio Resource Control (RRC) signaling.

4. A radio communication method for a user equipment (UE), comprising:
receiving, from a base station (BS), information regarding repetition of Channel State Information-Reference Signals (CSI-RSs), the CSI-RSs transmitted with a beam within a transmission period; and
controlling to receive, from the BS, the CSI-RSs based on the information, within the transmission period,
wherein, when the information regarding repetition of CSI-RSs indicates off, the UE controls to receive the CSI-RSs, from the BS, transmitted with respectively different beams within the transmission period.

5. A base station (BS) comprising:
a transmitter that transmits, to a user equipment (UE), information regarding repetition of Channel State Information-Reference Signals (CSI-RSs), the CSI-RSs transmitted with a beam within a transmission period; and
a processor,
wherein, when the information regarding repetition of CSI-RSs indicates off, the processor controls to transmit the CSI-RSs, to the UE, with a same respectively different beams within the transmission period.

6. A system comprising a base station (BS) and a user equipment (UE), wherein:
the BS comprises:
a transmitter that transmits, to the UE, information regarding repetition of Channel State Information-Reference Signals (CSI-RSs) the CSI-RSs transmitted with a beam within a transmission period; and
a processor,
wherein when the information regarding repetition of CSI-RSs indicates off, the processor of the BS controls to transmit the CSI-RSs, to the UE, with respectively different beams within the transmission period; and
the UE comprises:
a receiver that receives, from the BS, the information; and
a processor that controls to receive, from the BS, the CSI-RSs, based on the information, within the transmission period, and
wherein, when the information regarding repetition of CSI-RSs indicates off, the processor of the UE controls to receive the CSI-RSs, from the BS, transmitted with the respectively different beams within the transmission period.

\* \* \* \* \*

UNITED STATES PATENT AND TRADEMARK OFFICE
CERTIFICATE OF CORRECTION

| | |
|---|---|
| PATENT NO. | : 11,533,099 B2 |
| APPLICATION NO. | : 16/324874 |
| DATED | : December 20, 2022 |
| INVENTOR(S) | : Yuichi Kakishima et al. |

It is certified that error appears in the above-identified patent and that said Letters Patent is hereby corrected as shown below:

In the Claims

At Column 16, Claim number 5, Line numbers 1-2, "with a same respectively different beams" should read -- with respectively different beams --.

Signed and Sealed this
Twenty-seventh Day of February, 2024

*Katherine Kelly Vidal*

Katherine Kelly Vidal
*Director of the United States Patent and Trademark Office*